United States Patent
Wu et al.

(10) Patent No.: US 9,971,389 B2
(45) Date of Patent: May 15, 2018

(54) PER-PHASE CURRENT CALIBRATION METHOD FOR A MULTI-PHASE VOLTAGE REGULATOR

(71) Applicant: DELL PRODUCTS, L.P., Round Rock, TX (US)

(72) Inventors: Feng-Yu Wu, Taipei (TW); Tsai-Fu Hung, Hsin-Duan (TW); Shin-Chen Wang, Taipei (TW); Shiguo Luo, Austin, TX (US); Kejiu Zhang, Round Rock, TX (US)

(73) Assignee: Dell Products, L.P., Round Rock, TX (US)

(*) Notice: Subject to any disclaimer, the term of this patent is extended or adjusted under 35 U.S.C. 154(b) by 241 days.

(21) Appl. No.: 14/841,676

(22) Filed: Aug. 31, 2015

(65) Prior Publication Data
US 2017/0060213 A1 Mar. 2, 2017

(51) Int. Cl.
G06F 1/28 (2006.01)
G05F 1/625 (2006.01)
H02M 3/156 (2006.01)

(52) U.S. Cl.
CPC .............. G06F 1/28 (2013.01); G05F 1/625 (2013.01); H02M 3/156 (2013.01)

(58) Field of Classification Search
CPC .................................. G06F 1/28; G05F 1/625
See application file for complete search history.

(56) References Cited

U.S. PATENT DOCUMENTS

| | | | |
|---|---|---|---|
| 7,262,628 B2 | 8/2007 | Southwell et al. | |
| 8,253,405 B2 | 8/2012 | Trivedi et al. | |
| 2006/0001408 A1* | 1/2006 | Southwell | H02M 3/1584 323/282 |
| 2007/0188219 A1* | 8/2007 | Segarra | G01R 19/32 330/2 |
| 2011/0221405 A1* | 9/2011 | Tang | H02M 3/156 323/234 |
| 2013/0249518 A1* | 9/2013 | Giannopoulos | H02M 3/156 323/284 |
| 2014/0232420 A1* | 8/2014 | Luo | H02M 3/1584 324/750.01 |

* cited by examiner

*Primary Examiner* — Jaweed A Abbaszadeh
*Assistant Examiner* — Cheri Harrington
(74) *Attorney, Agent, or Firm* — Isidore PLLC

(57) ABSTRACT

An information handling system (IHS) performs current calibration of a multi-phase VR using leakage current as a reference current. The IHS includes a multi-phase voltage regulator (VR) module coupled to an output port of a power supply unit (PSU). The VR module includes: a multi-phase VR having an integrated power stage that provides pulse width modulation (PWM) functionality for controlling operating phases of VR current in the multi-phase VR; and a digital controller coupled to the multi-phase VR. The controller: enables a known, high accuracy operating phase as loading calibrator for offset training; records a leakage current value as a reference current; enables a first unknown, low accuracy operating phase; determines, for the unknown operating phase, an offset value that provides a specified target current accuracy; updates an offset register for the unknown operating phase with the corresponding offset value; and disables the unknown operating phase.

20 Claims, 16 Drawing Sheets

PER-PHASE CURRENT CALIBRATION METHOD FOR A MULTI-PHASE VOLTAGE REGULATOR

RELATED APPLICATIONS

The present application is related to the following copending U.S. patent application Ser. No. 14/841,669 filed concurrently herewith. All relevant content of that related application is incorporated herein by reference.

BACKGROUND

1. Technical Field

The present disclosure generally relates to information handling systems (IHS) and in particular to multi-phase voltage regulation within information handling systems.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically utilize multi-phase voltage regulators (VR) to supply power to loads such as central processing units (CPUs) and memory. These multi-phase VRs are expected to deliver power from a primary source to an electrical load at a specified current, voltage, and power efficiency.

As processor speeds and microprocessor integration into information handling systems continue to increase, power regulation system demands also increase. Multi-phase voltage regulators include a number of discrete components including inductors and capacitors. In addition, the multi-phase VR typically utilizes a pulse width modulation (PWM) controller to control the individual phases of the multi-phase VR. The current accuracy of a power converter depends on the PWM controller's internal sense gain, and sense devices such as a current-shunt inductor or a direct current resistance (DCR) of an inductor. Inaccurate current information can adversely impact the multi-phase VR and the overall system performance. With typical component tolerances being relatively large compared with a specified accuracy requirement for particular microelectronic devices, higher accuracy components can be utilized. However, the use of higher accuracy components are directly related to increased system implementation costs while providing relatively low yield. For example, the cost difference can be in the range of 20-50 times for utilizing a resistor having a tolerance of 0.1% instead of a 1% tolerance. During a calibration process, component tolerances and power device mismatches result in unequal sharing of the load current among the phases of a multi-phase regulator. This unequal sharing of load current causes inadequate operation of, and excessive heat generation in, the power devices corresponding to the active phases of a multi-phase power supply.

Servers are requiring ever increasing accuracy for power telemetry data to be used in system level power and thermal management algorithms. For example, CPU power management algorithms poll CPU load current information from CPU core voltage (Vcore) Voltage Regulators (VRs) in order to optimize CPU performance versus power consumption while still maintaining safe system operation. Current sense accuracy directly impacts system performance, power saving and reliability. Consequently, tighter current sense accuracy targets are specified for many next generation servers. As a result of these design challenges, the power requirements for emerging leading edge technology microprocessors have become very difficult to satisfy.

BRIEF SUMMARY

Disclosed are a method and an information handling system (IHS) that perform current calibration of the multi-phase VR using leakage current as a reference current. The IHS includes a processor and a power supply unit (PSU). The IHS also includes a multi-phase voltage regulator (VR) module coupled to an output port of the PSU to receive input power. The VR module includes: a multi-phase VR having an integrated power stage that provides pulse width modulation (PWM) functionality for controlling respective operating phases of VR current in the multi-phase VR; and a digital controller coupled to the multi-phase VR. The controller enables a known, high accuracy operating phase as loading calibrator for offset training; records a leakage current value as a reference current; enables a first unknown, low accuracy operating phase; determines, for the respective enabled unknown operating phase, an offset value that provides a specified target current accuracy; updates an offset register for the respective enabled unknown operating phase with the corresponding offset value; and disables the respective enabled unknown operating phase.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
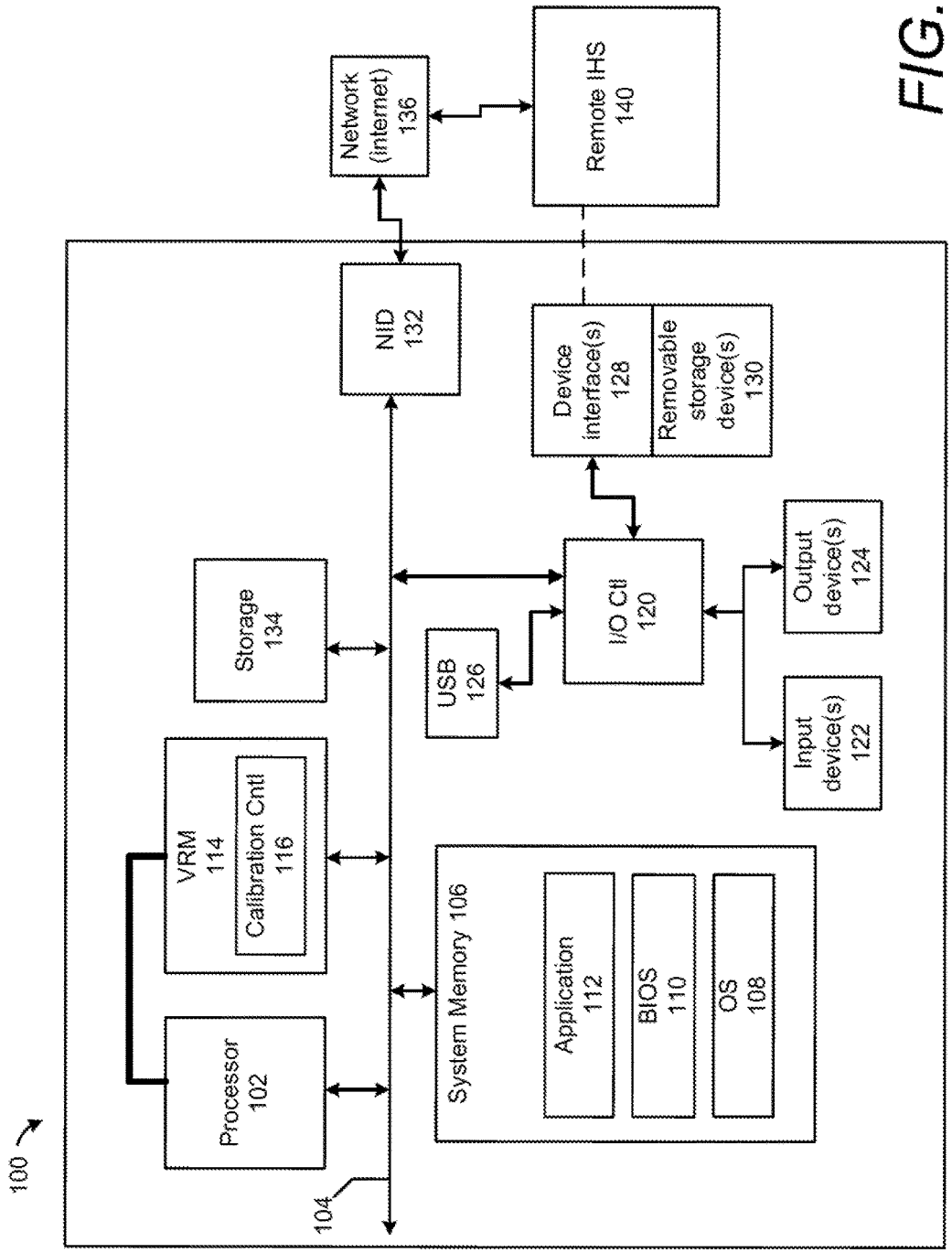
FIG. 1 illustrates an example information handling system (IHS) within which various aspects of the disclosure can be implemented, according to one or more embodiments.

The illustrative embodiments provide a method and an information handling system (IHS) that perform current calibration of a multi-phase voltage regulator (VR) by using a calibrated operating phase to calibrate an unknown operating phase. A calibration controller, using a pulse width modulation (PWM) controller, enables a first unknown operating phase within a first converter sub-circuit in the multiphase VR. The calibration controller enables a calibrated circuit component that is electronically coupled to the first unknown operating phase. The calibration controller determines a target voltage for the first unknown operating phase based on sense component specifications. The calibration controller determines, for the first unknown operating phase, a sense voltage that identifies the first unknown operating phase as a first evaluated operating phase. The calibration controller performs calibration of operating phases of the multi-phase VR, including the first evaluated operating phase, based on a respective difference between a sense voltage and a corresponding target voltage for each operating phase.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Those of ordinary skill in the art will appreciate that the hardware, firmware/software utility, and software components and basic configuration thereof depicted in the following figures may vary. For example, the illustrative components of the IHS are not intended to be exhaustive, but rather are representative to highlight some of the components that are utilized to implement certain of the described embodiments. For example, different configurations of an IHS may be provided, containing other devices/components, which may be used in addition to, or in place of, the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 106 via system interconnect 104. System interconnect 104 can be interchangeably referred to as a system bus, in one or more embodiments. Also coupled to system interconnect 104 is storage 134 within which can be stored one or more software and/or firmware modules and/or data (not specifically shown). In one embodiment, storage 134 can be a hard drive or a solid state drive. The one or more software and/or firmware modules within storage 134 can be loaded into system memory 106 during operation of IHS 100. As shown, system memory 106 can include therein a plurality of modules, including Basic Input/Output System (BIOS) 110, operating system (O/S) 108, application(s) 112 and firmware (not shown). In one or more embodiments, BIOS 110 comprises additional functionality associated with unified extensible firmware interface (UEFI), and can be more completely referred to as BIOS/UEFI 110 in these embodiments. The various software and/or firmware modules have varying functionality when their corresponding program code is executed by processor(s) 102 or other processing devices within IHS 100.

IHS 100 further includes one or more input/output (I/O) controllers 120 which support connection to, and processing of, signals from one or more connected input device(s) 122, such as a keyboard, mouse, touch screen, or microphone. I/O controllers 120 also support connection to, and forwarding of, output signals to one or more connected output device(s) 124, such as a monitor or display device or audio speaker(s). In addition, IHS 100 includes universal serial bus (USB) 126 which is coupled to I/O controller 120. Additionally, in one or more embodiments, one or more device interface(s) 128, such as an optical reader, a universal serial bus (USB), a card reader, Personal Computer Memory Card International Association (PCMCIA) port, and/or a high-definition multimedia interface (HDMI), can be associated with IHS 100. Device interface(s) 128 can be utilized to enable data to be read from, or stored to, corresponding removable storage device(s) 130, such as a compact disk (CD), digital video disk (DVD), flash drive, or flash memory card. In one or more embodiments, device interface(s) 128 can also provide an integration point for connecting other device(s) to IHS 100. In one implementation, IHS 100 connects to remote IHS 140 using device interface(s) 128. In such implementation, device interface(s) 128 can further include General Purpose I/O interfaces such as $I^2C$, SMBus, and peripheral component interconnect (PCI) buses.

IHS 100 further comprises multi-phase voltage regulator (VR) module 114 which provides regulated power supply to system devices. For example, as illustrated, VR module 114 is electrically coupled to processor 102 in order to provide regulated current and/or voltage to processor 102. As illustrated, VR module 114 includes calibration controller 116 which performs calibration of operating phases of VR module 114.

IHS 100 comprises a network interface device (NID) 132. NID 132 enables IHS 100 to communicate and/or interface with other devices, services, and components that are located external to IHS 100. These devices, services, and components can interface with IHS 100 via an external network, such as example network 136, using one or more communication protocols. In particular, in one implementation, IHS 100 uses NID 132 to connect to remote IHS 140 via an external network, such as network 136.

Network 136 can be a wired local area network, a wireless wide area network, wireless personal area network, wireless local area network, and the like, and the connection to and/or between network 136 and IHS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

Figure 2:
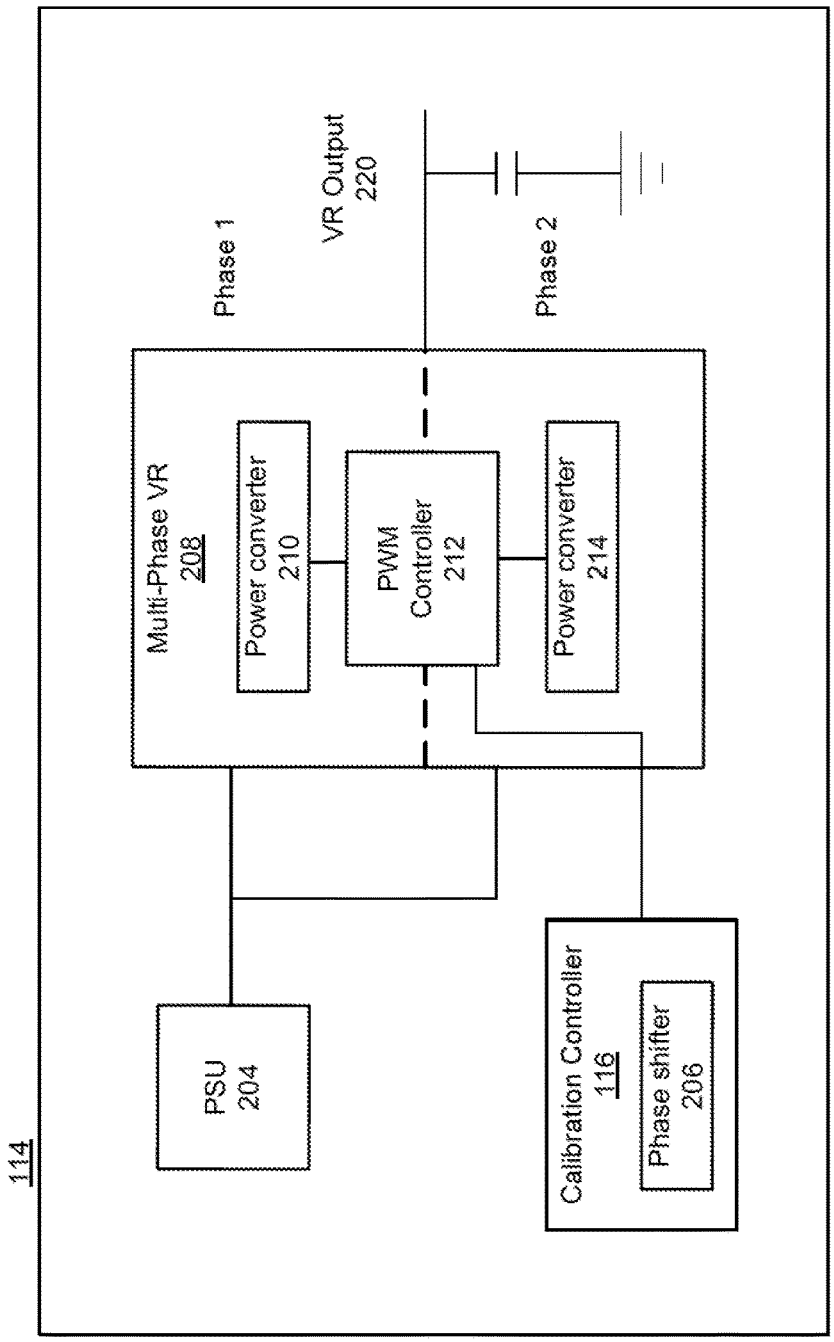
FIG. 2 depicts a block diagram illustration of a multi-phase voltage regulator (VR) module, according to one or more embodiments.

FIG. 2 depicts a block diagram illustration of a multi-phase voltage regulator (VR) module, according to one or more embodiments. Multi-phase VR module 114 comprises PSU 204 and multi-phase VR 208 coupled to an output of PSU 204. Multi-phase VR module 114 also comprises calibration controller 116 which is coupled to multi-phase VR 208. Multi-phase VR 208 further comprises first power converter circuit 210 corresponding to a first operational phase of multi-phase VR 208. Multi-phase VR 208 further comprises second power converter circuit 214 corresponding to a second operational phase of multi-phase VR 208. First and second power converter circuits 210 and 214 are coupled to an output (i.e., VR output 220) of multi-phase VR 208. Multi-phase VR 208 also comprises pulse width modulation (PWM) controller 212 which is coupled to both first and second power converter circuits 210 and 214 to activate/enable and deactivate/disable the respective operational/operating phases of multi-phase VR 208. As illustrated, calibration controller 116 is coupled to PWM controller 212. Calibration controller 116 performs a calibration process by utilizing PWM controller 212 to selectively activate, deactivate, control and modify the respective operational/operating phases of multi-phase VR 208.

Figure 3:
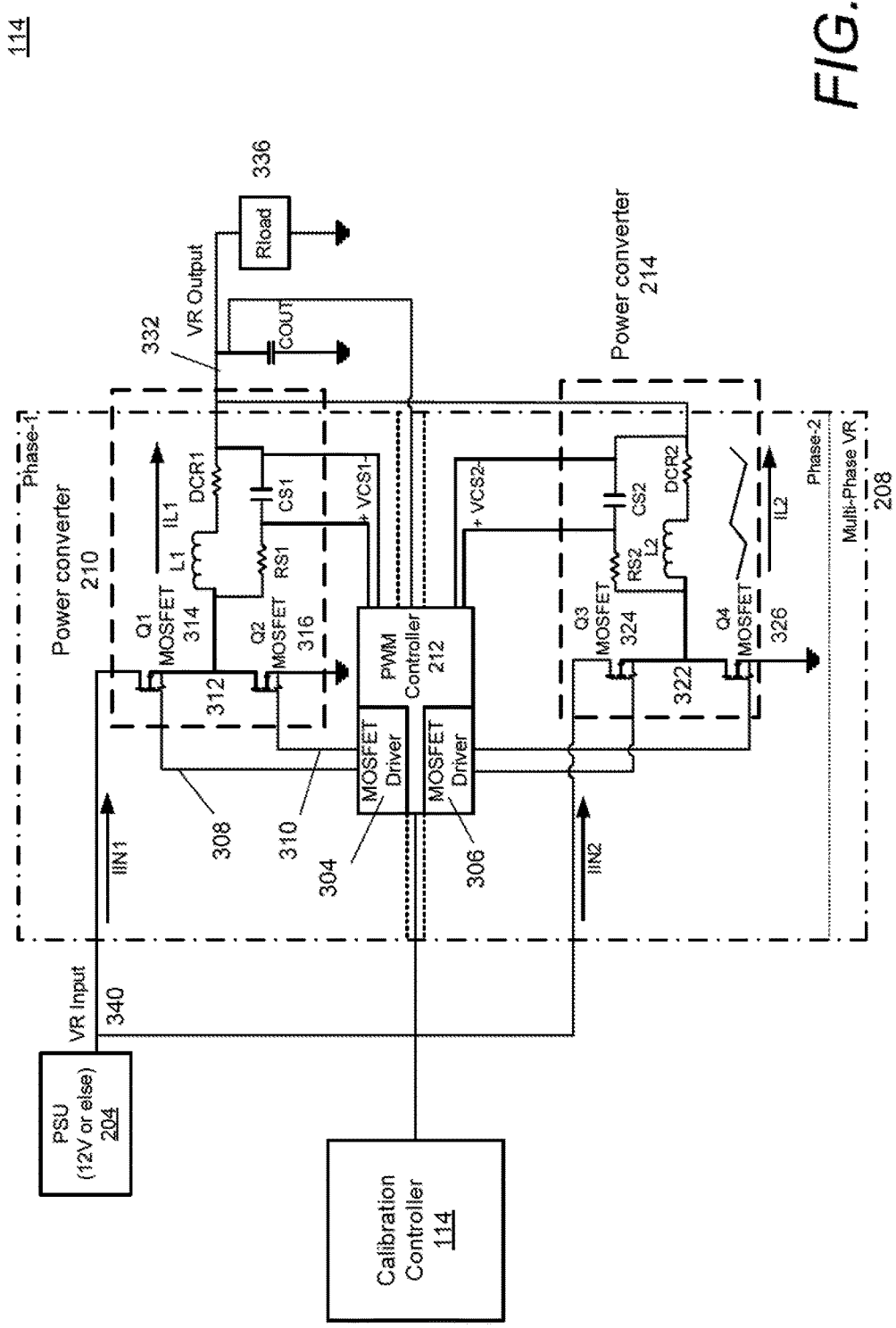
FIG. 3 illustrates a multi-phase VR with a current sense network, according to one embodiment.

FIG. 3 illustrates a multi-phase VR with a current sense network, according to one embodiment. Multi-phase VR module 114 comprises PSU 204 and multi-phase VR 208 coupled to an output of PSU 204. Multi-phase VR module 114 also comprises calibration controller 116 which is coupled to multi-phase VR 208. Multi-phase VR 208 further comprises first power converter circuit 210 corresponding to a first operational phase of multi-phase VR 208. Multi-phase VR 208 further comprises second power converter circuit 214 corresponding to a second operational phase of multi-phase VR 208. First and second power converter circuits 210 and 214 are coupled to an output of multi-phase VR 208. Multi-phase VR 208 also comprises pulse width modulation (PWM) controller 212 which is coupled to both first and second power converter circuits 210 and 214 to activate/enable and deactivate/disable the respective operational/operating phases of multi-phase VR 208. As illustrated, calibration controller 116 is coupled to PWM controller 212. Calibration controller 116 performs a calibration process by utilizing PWM controller 212 to selectively activate, deactivate, control and modify the respective operational/operating phases of multi-phase VR 208.

First power converter circuit 210 comprises first MOSFET (Q1) 314 that is driven by first drive signal 308 from first MOSFET driver 304 and a second MOSFET (Q2) 316 that is driven by second drive signal 310 from first MOSFET driver 304. First MOSFET Q1 314 is coupled to second MOSFET Q2 316 at first node 312. First power converter circuit 210 also comprises first inductor L1 which is coupled to first node 312. First inductor L1 is coupled in series to a first direct current resistance (DCR1). The series coupling of first inductor L1 and DCR1 is coupled between first node 312 and output node 332 of multi-phase VR 208. First MOSFET (Q1) 314 is coupled between a voltage regulator (VR) input node 340 and first node 312. Second MOSFET (Q2) 316 is coupled between first node 312 and ground. First power converter circuit 210 also comprises first sense resistor RS1. First sense resistor RS1 is coupled in series to first sense capacitor CS1. The series coupling of first sense resistor RS1 and first sense capacitor CS1 is coupled between first node 312 and output node 332, and in parallel with the series coupling of first inductor L1 and first direct current resistance DCR1. An output capacitor, Cout, couples output node 332 to ground. Calibrated external load "Rload" 336 is coupled between output node 332 and ground. PWM controller 212 determines a first current sense voltage VCS1 across first sense capacitor CS1.

Second power converter circuit 214 comprises third MOSFET (Q3) 324 that is driven by a drive signal from second MOSFET driver 306 and fourth MOSFET (Q4) 326 that is driven by a drive signal by second MOSFET driver 306. Third MOSFET Q3 324 is coupled to fourth MOSFET Q4 326 at second node 322. Second power converter circuit 214 also comprises second inductor L2 which is coupled to second node 322. Second inductor L2 is coupled in series to a second direct current resistance (DCR2). The series coupling of second inductor L2 and DCR2 is coupled between second node 322 and output node 332 of multi-phase VR 208. Third MOSFET (Q3) 324 is coupled between a voltage regulator (VR) input node 340 and second node 322. Fourth MOSFET (Q4) 326 is coupled between second node 322 and ground. Second power converter circuit 214 also comprises second sense resistor RS2. Second sense resistor RS2 is coupled in series to second sense capacitor CS2. The series coupling of second sense resistor RS2 and second sense capacitor CS2 is coupled between second node 322 and output node 332, and in parallel with the series coupling of second inductor L2 and second direct current resistance DCR2. PWM controller 212 determines a second current sense voltage VCS2 across second sense capacitor CS2.

Calibration controller 116 performs current calibration of multi-phase voltage regulator (VR) 208 by using a calibrated operating phase to calibrate an unknown operating phase. Calibration controller 116, using pulse width modulation (PWM) controller 212, enables a first unknown operating phase within a first converter sub-circuit 210 in multiphase VR 208. Calibration controller 116 enables a calibrated external load/circuit component electronically coupled to the first unknown operating phase. Calibration controller 116 determines a target voltage for the first unknown operating phase based on sense component specifications. Calibration controller 116 determines, for the first unknown operating phase, a sense voltage which identifies the first unknown operating phase as a first evaluated operating phase. Calibration controller 116 performs calibration of operating phases of the multi-phase VR, including the first evaluated operating phase, based on a respective difference between a sense voltage and a corresponding target voltage for each operating phase.

In one implementation, the following equation applies to the power converter or sub-converter sense circuitry:

$$\text{current sense voltage} = \text{DC offset} + IL*DCR*\text{current sense gain},$$

where IL represents a current amplitude of a corresponding operating phase. When there is no component error indicating that there is no mismatch between operating phases, a current amplitude of a second operating phase (i.e., IL2) equals a negative value of a current amplitude of a first operating phase (i.e., −IL1). Furthermore, if there is no component error in the multi-phase VR 208, the current sense voltage or Vcs for a first operating phase and the current sense voltage for a second operating phase are provided as follows:

$$\text{current sense voltage} = \text{DC offset} + IL1*DCR*\text{current sense gain[first operating phase]; and} \quad (i)$$

$$\text{current sense voltage} = \text{DC offset} - IL1*DCR*\text{current sense gain[second operating phase].} \quad (ii)$$

However, when the current amplitudes of respective operating phases are different a sense voltage of an unknown operating phase is found to be mismatched with a corresponding target voltage. As a result of identifying the mismatch, calibration controller 116 utilizes PWM controller 212 to calibrate, using selected drive signals, multi-phase VR 208 based on the difference between the sense and target voltages.

The current accuracy of the power converter depends on the sense devices such as current-shunt or DCR of inductor (L), which are illustrated within multi-phase VR module 114. If the time-constants of sense components for an operating phase are matched, where L/DCR=RS×CS, the cross voltage of sense capacitor (Vcs) will be proportional to the inductor current such that Vcs=IL×DCR. As a result, calibration controller 116 utilizes PWM controller 212 to determine the total current of the multi-phase VR 208 by sensing the Vcs of all operating phases.

Figure 4:
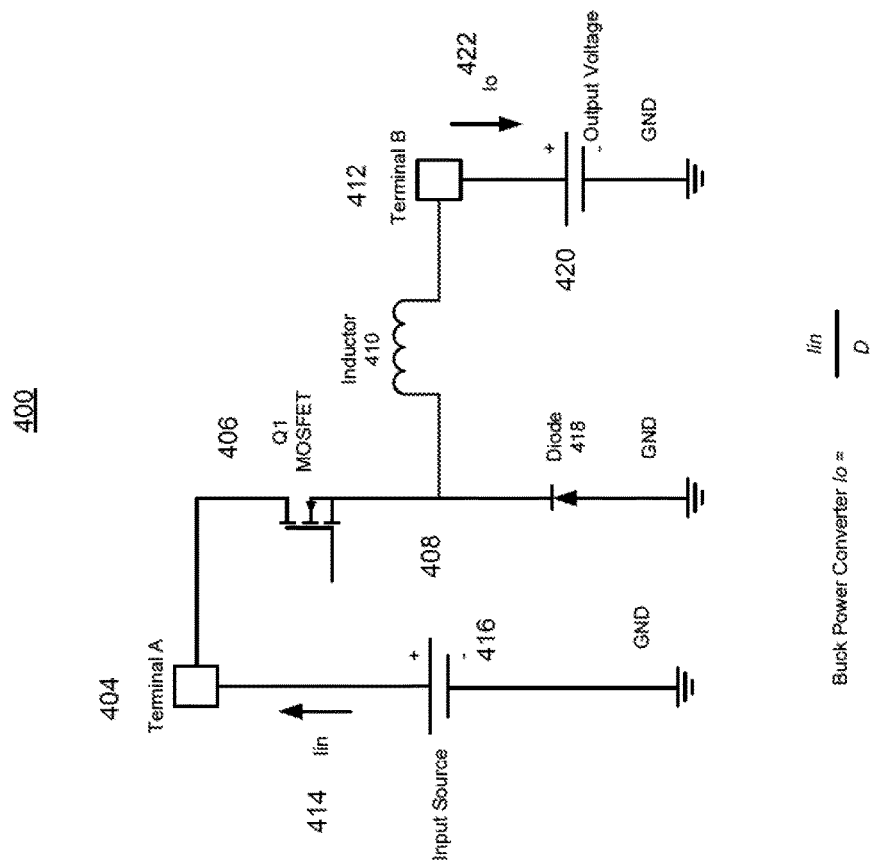
FIG. 4 illustrates a synchronous rectifier (SR) circuit configured as a buck power converter that supplies power within the multi-phase VR, according to one embodiment.

FIG. 4 illustrates a synchronous rectifier (SR) circuit configured as a buck power converter that supplies power within the multiphase VR 208, according to one embodiment. SR circuit 400 comprises terminal A 404 which is coupled to ground via input capacitor 416. In addition, SR circuit 400 comprises first MOSFET (Q1) 406 that is coupled to terminal A 404 and diode 418 that is coupled to first MOSFET Q1 406 at node 408. Diode 418 represents a second MOSFET (Q2) that the calibration controller 116 has configured in an ON state. Diode 418 is coupled between node 408 and ground, which is also illustrated as GND, within SR circuit 400. SR circuit 400 also comprises inductor 410 which is coupled between node 408 and terminal B 412. Terminal B 412 is coupled to ground via output capacitor 420. The potential difference that can be measured across the terminals/plates of output capacitor 420 provides a corresponding output voltage. The output current is equal to the input current divided by a ratio, D, which represents the output voltage divided by the input voltage.

SR circuit 400 also comprises input current Iin 414 which flows into terminal A 404. In addition, SR circuit 400 comprises output current Io 422 which flows in a first current direction from terminal B 412 towards ground. As illustrated within SR circuit 400, terminal A 404 is the output, terminal B 412 is the input, and power flows in a first direction from terminal A 404 to terminal B 412. By configuring an SR circuit 400 in a buck converter mode using SR circuit 400, calibration controller 116 enables a corresponding operating phase to operate as a power source capable of supplying power to another operating phase.

Figure 5:
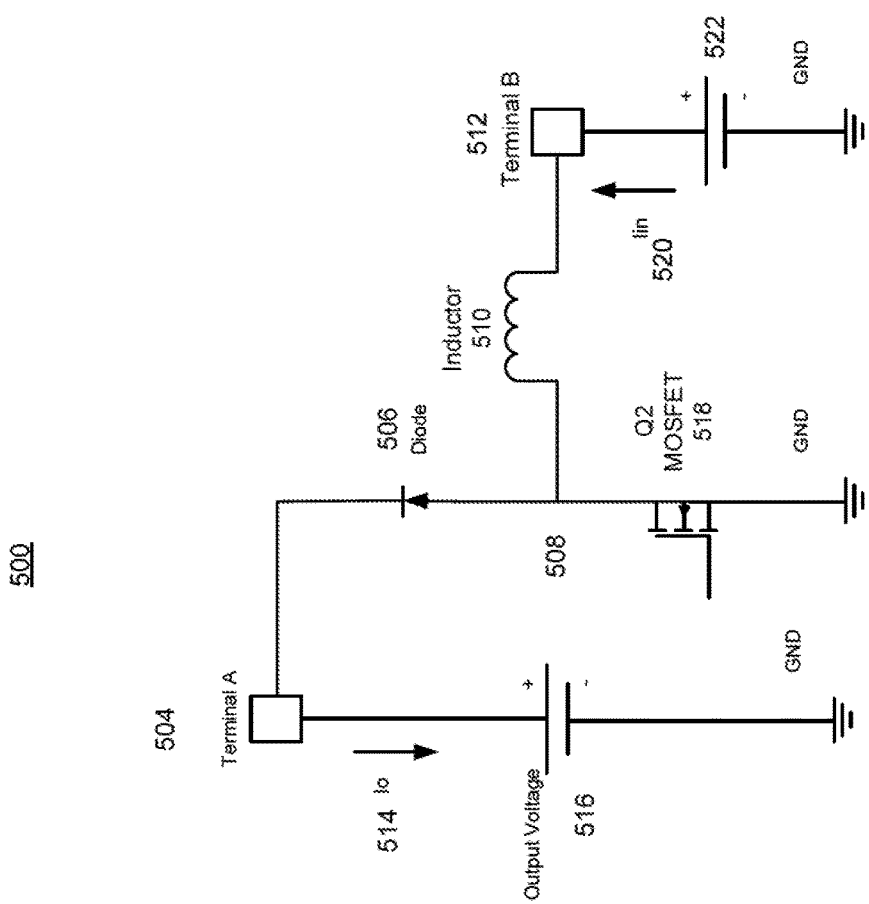
FIG. 5 illustrates a synchronous rectifier (SR) circuit configured as a boost power converter that sinks power within the multi-phase VR, according to one embodiment.

FIG. 5 illustrates a synchronous rectifier (SR) circuit configured as a boost power converter that sinks power within the multiphase VR, according to one embodiment. SR circuit 500 comprises terminal A 504 which is coupled to ground via output capacitor 516. The potential difference measurable across the terminals/plates of output capacitor 516 provides a corresponding output voltage. In addition, SR circuit 500 comprises diode 506 that is coupled to terminal A 504 and second MOSFET (Q2) 518 that is coupled to diode 506 at node 508. Diode 506 represents a first MOSFET (Q1) that the calibration controller 116 has configured in an ON state. Second MOSFET (Q2) 518 is coupled between node 508 and ground, which is illustrated as GND, within SR circuit 500. SR circuit 500 also comprises inductor 510 which is coupled between node 508 and terminal B 512. Terminal B 512 is coupled to ground via input capacitor 522. SR circuit 500 also comprises input current Iin 520 which flows into terminal B 512. In addition, SR circuit 500 comprises output current Io 514 which flows from terminal A 504 towards ground. As illustrated within SR circuit 500, terminal A 504 is the input, terminal B 512 is the output, and power flows in a second direction from terminal B 512 to terminal A 504. The input current is equal to the output current multiplied by 1 minus the ratio D (i.e., Io*(1−D)), where D represents the output voltage divided by the input voltage. By configuring an SR circuit 500 in a boost converter mode using SR circuit 500, calibration controller 116 enables a corresponding operating phase to operate as a power sink capable of sourcing power from another operating phase. For example, calibration controller 116 can configure a first phase for operation as a buck converter using SR circuit 500 (FIG. 5) to supply power to a second phase that calibration controller 116 configures for operation as a boost converter using SR circuit 500.

Calibration controller 116 utilizes the synchronous rectifier (SR) design to provide enhanced efficiency during heavy load conditions, while being able to configure the SR to deliver power bi-directionally, as illustrated in FIGS. 4 and 5. In a Buck converter topology, terminal A is the input and terminal B is the output, as illustrated with SR circuit 400. In a Boost converter topology, terminal A is the output and terminal B is the input, as illustrated with SR circuit 500. By selectively configuring operating phases as buck converters and boost converters, respectively, calibration controller is able to use a known/calibrated operating phase to calibrate an unknown/uncalibrated operating phase. In addition, calibration controller 116 recycles power provided by one operating phase to reduce an amount of input energy demanded by another operating phase. By closing a power flow loop enabling an output power/current for a first operating phase to be used to provide an input power/current for a second operating phase, calibration controller 116 substantially reduces an average input power.

Figure 6:
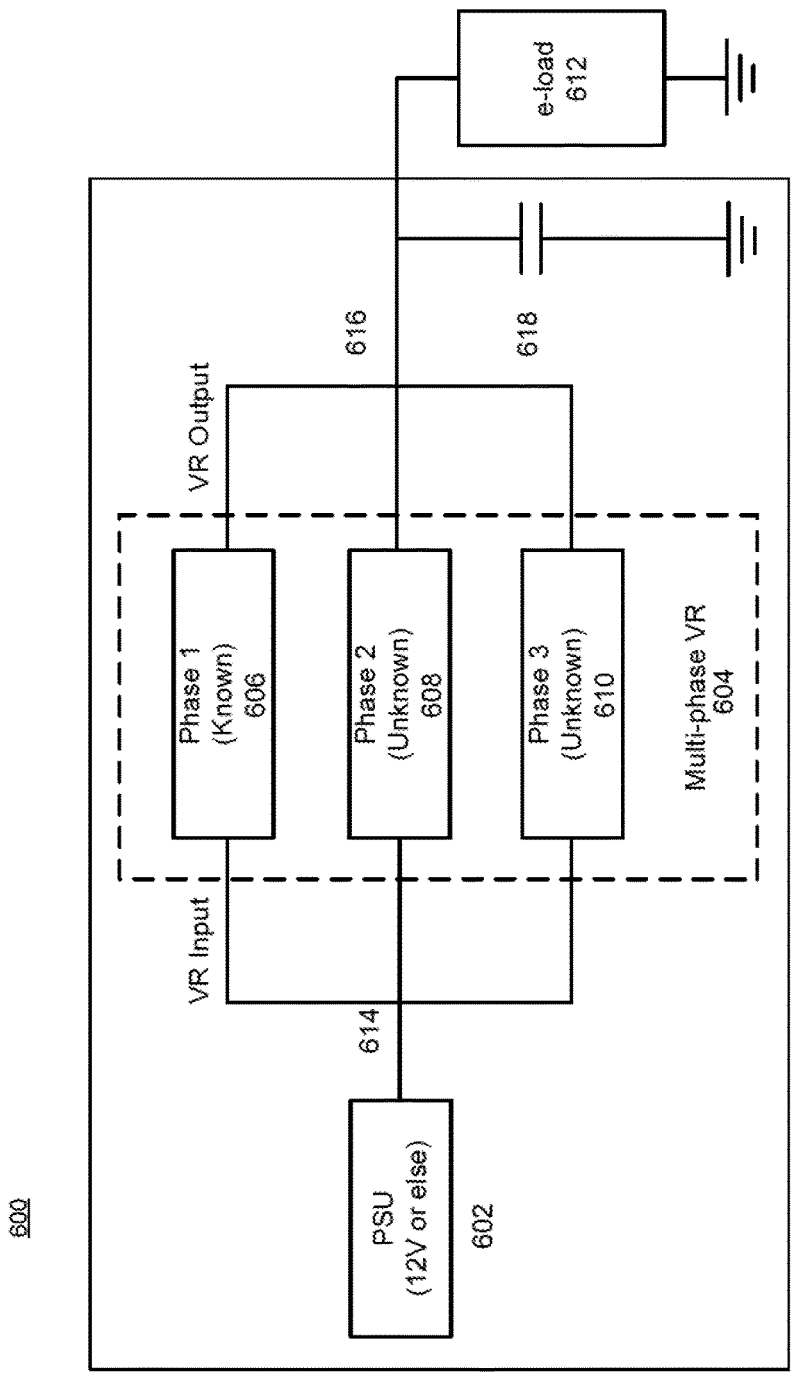
FIG. 6 is a block diagram illustrating a multi-phase VR coupled to an external load, according to one embodiment.

FIG. 6 is a block diagram illustrating a multi-phase VR coupled to an external load, according to one embodiment. Multi-phase VR module 600 comprises PSU 602 and multi-phase VR 604 coupled to PSU 602. Multi-phase VR 604 further comprises first known operational phase 606, first unknown operational phase 608 and second unknown operational phase 610. Operational phases 606, 608 and 610 are coupled in parallel between VR input node 614 and VR output node 616. As illustrated within multi-phase VR module 600, VR output node 616 is coupled to ground via capacitor 618. Multi-phase VR module 600 also comprises calibration external load 612 coupled between VR output node 616 and ground and in parallel with capacitor 618.

Calibration controller 116 utilizes a calibrated external load when all operating phases are initially unknown to perform measurements on an initially unknown operating phase. As a result, calibration controller 116 performs calibration to identify an initially unknown operating phase as an evaluated and known operating phase (referred to herein as an evaluated operating phase).

Calibration controller 116 then utilizes the evaluated operating phase to calibrate other unknown operating phases. In another embodiment, calibration controller 116 utilizes a pre-established and known operating phase (referred to herein as a known operating phase) that utilizes high precision sense components to calibrate unknown operating phases.

Figure 7:
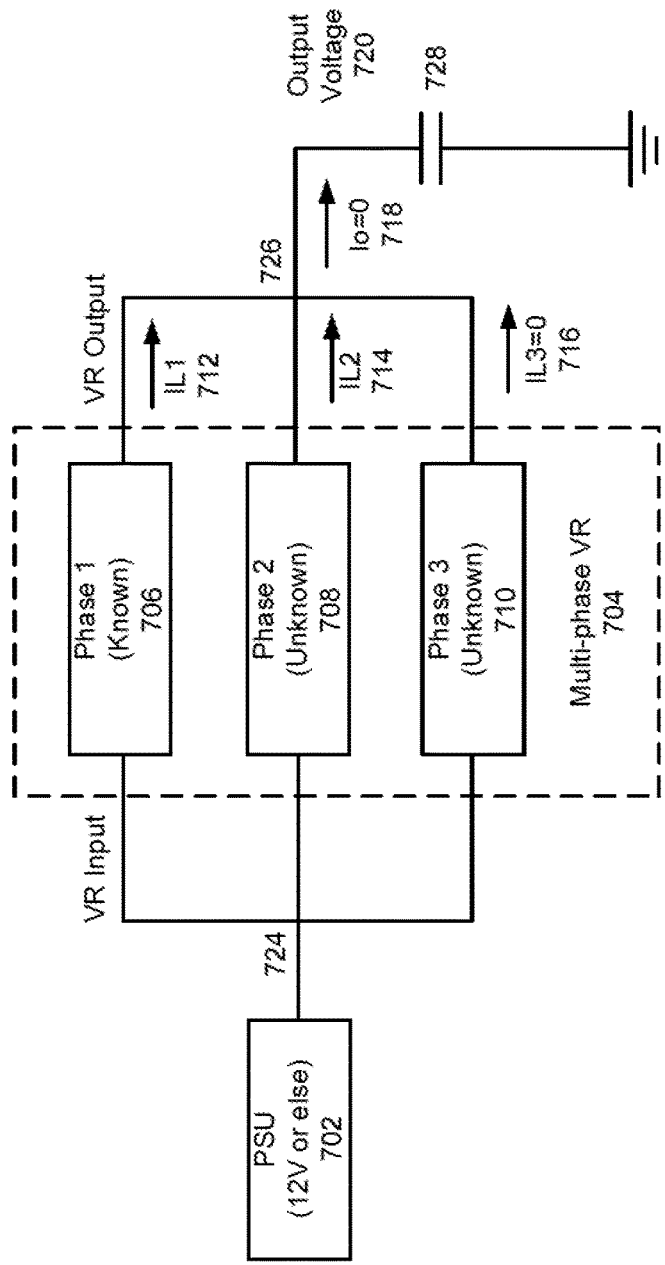
FIG. 7 is a block diagram illustrating a multi-phase VR with calibration between operating phases, according to one embodiment.

FIG. 7 is a block diagram illustrating a multi-phase VR with calibration between operating phases, according to one embodiment. Multi-phase VR module 700 comprises PSU 702 and multi-phase VR 704 coupled to PSU 702. Multi-phase VR 704 further comprises first known operational phase 706, first unknown operational phase 708 and second unknown operational phase 710. Operational phases 706, 708 and 710 are coupled in parallel between VR input node 724 and VR output node 726. Multi-phase VR 704 also comprises first current amplitude IL1 712 corresponding to first known operating phase 706, second current amplitude IL2 714 corresponding to first unknown operating phase 708, and third current amplitude IL3 716 corresponding to second unknown operating phase 710. Output current Io 718 and output voltage 720 are also depicted within multi-phase VR module 700. As illustrated within multi-phase VR module 700, VR output node 726 is coupled to ground via capacitor 728.

Calibration controller 116 (FIG. 2) utilizes a known operating phase or an evaluated operating phase to calibrate phase-2, which is a first unknown operating phase. While phase-2 is being calibrated, phase-3, which is a second unknown operating phase, is not activated. Calibration controller 116 calibrates phase-2 to achieve a substantially zero value for output current Io, where IL1 plus IL2 equals zero.

Calibration controller 116 (FIG. 2) enables first unknown operational phase 708 (e.g., "Phase 2") in a Constant Voltage (CV) mode to establish the output voltage. In response to establishing the output voltage, calibration controller 116 enables known phase 706 (e.g., "Phase 1") in Constant Current (CC) mode. Based on Kirchhoff's Current Law (KCL), I2=−I1 or −I2=I1, as illustrated within multi-phase VR module 700. Since the phase-2 current IL2 is controlled by the phase-1 current IL1, calibration controller 116 (FIG. 2) is able to utilize pulse width modulation (PWM) controller 212 (FIG. 2) to measure the respective current sense voltages/VCSs of Phase 1 and Phase 2, compare the VCSs with respect to corresponding target voltages, and calibrate the difference between Phase 1 and Phase 2 current sense voltages/VCSs with respect to corresponding target voltages.

After performing calibration or calibration measurements on Phase 2, calibration controller 116 can similarly calibrate Phase 3, a second unknown operating phase 710. A calibration controller (not shown) using a PWM controller (not shown) controls and modifies operating phases of multi-phase VR 704.

Figure 8:
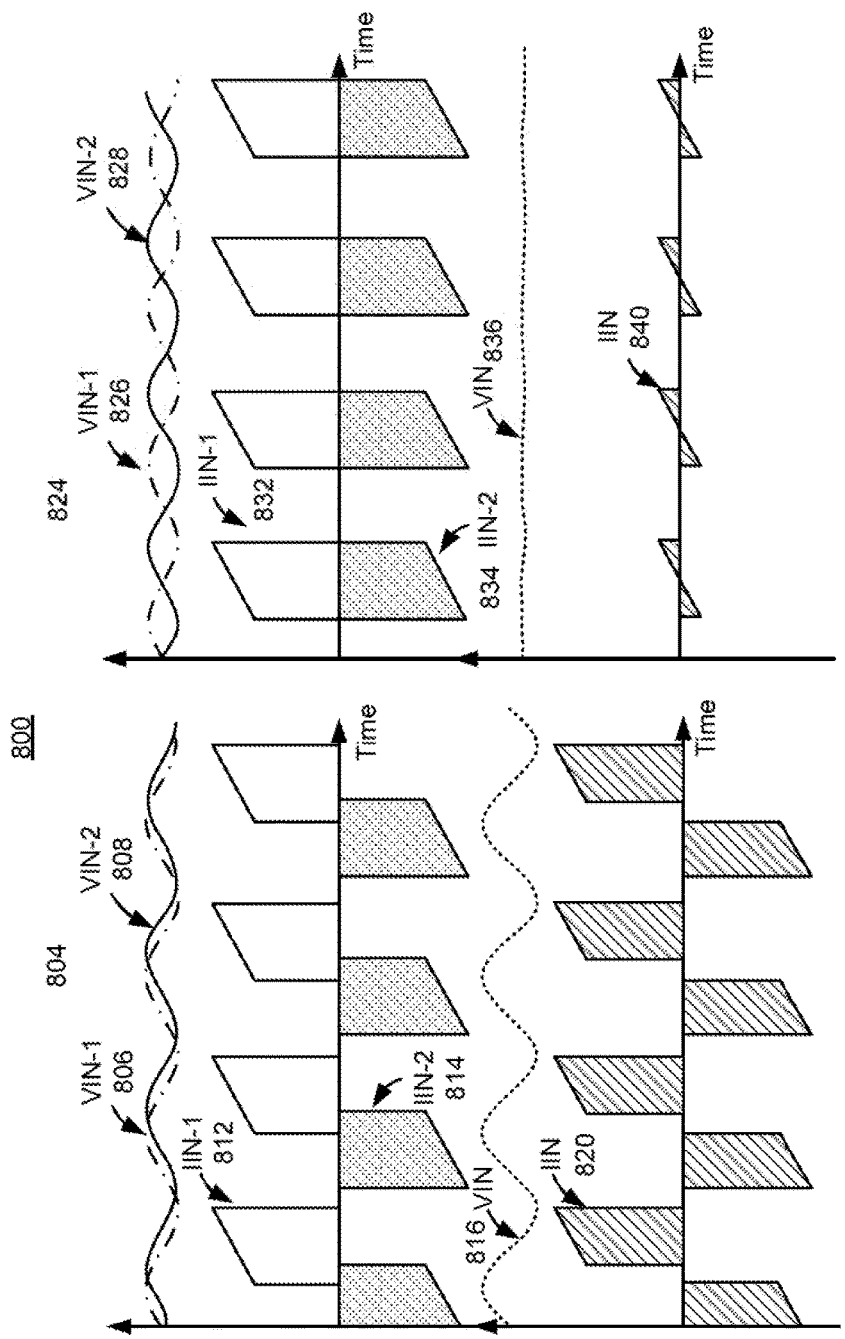
FIG. 8 illustrates waveforms for input voltage and current of a multi-phase VR with and without a selected phase shift being applied, according to one embodiment.

FIG. 8 illustrates waveforms for input voltage and current of a multi-phase VR with and without a selected phase shift being applied, according to one embodiment. Waveform sets 800 comprise first waveform set 804 and second waveform set 824. First waveform set 804 comprises first input voltage waveform 806 corresponding to a first operating multiphase and second input voltage waveform 808 corresponding to a second operating phase. First waveform set 804 also comprises first input current pulse 812 corresponding to the first operating multiphase and second input current pulse 814 corresponding to the second operating phase. First waveform set 804 also comprises overall input voltage waveform 816 corresponding to a combination of first input voltage waveform 806 and second input voltage waveform 808. First waveform set 804 also comprises overall input current pulse 820 resulting from first input current pulse 812 added to second input current pulse 814.

Second waveform set 824 provides input current and voltage waveforms when a phase shift has been applied between the input current signals and between the input voltage signals for the first and second operating phases. Second waveform set 824 comprises first input voltage waveform 826 corresponding to a first operating multiphase and second input voltage waveform 828 corresponding to a second operating phase. Second waveform set 824 also comprises first input current pulse 832 corresponding to the first operating multiphase and second input current pulse 834 corresponding to the second operating phase. Second waveform set 824 also comprises overall input voltage waveform 836 resulting from a combination of first input voltage waveform 826 and second input voltage waveform 828. Second waveform set 824 also comprises overall input current pulse 840 resulting from first input current pulse 832 added to second input current pulse 834.

In comparison to first waveform set 804, second waveform set 824 utilizes a phase shift function to enable an increase in overlap symmetry of input current signals of respective operating phases. In particular, in one implementation, substantially perfect overlap symmetry occurs when calibration controller 116 (FIG. 1) utilizes phase-shifter 206 (FIG. 2) to achieve a net phase shift of +/−360/n degrees between input current or voltage signals of corresponding operating phases. For example, if the calibrating phase number "n" is equal to 2, the phase shift is equal to 180 degrees (i.e., 360/2 degrees).

As a result of the overlap symmetry, calibration controller 116 provides, relative to first waveform set 804, both a reduced input current ripple and a reduced input voltage ripple, as illustrated within second waveform set 824. First waveform set 804 corresponds to calibration controller 116 performing calibration, without applying a phase-shift, which can result in an average power reduction relative to traditional calibration approaches which utilize non-overlapping, interleaving current and/or voltage signals. However, second waveform set 824 corresponds to calibration controller 116 performing calibration, while applying a phase-shift, which can result in average and instantaneous power reductions with reduced current and voltage ripples relative to traditional calibration approaches.

Figure 9:
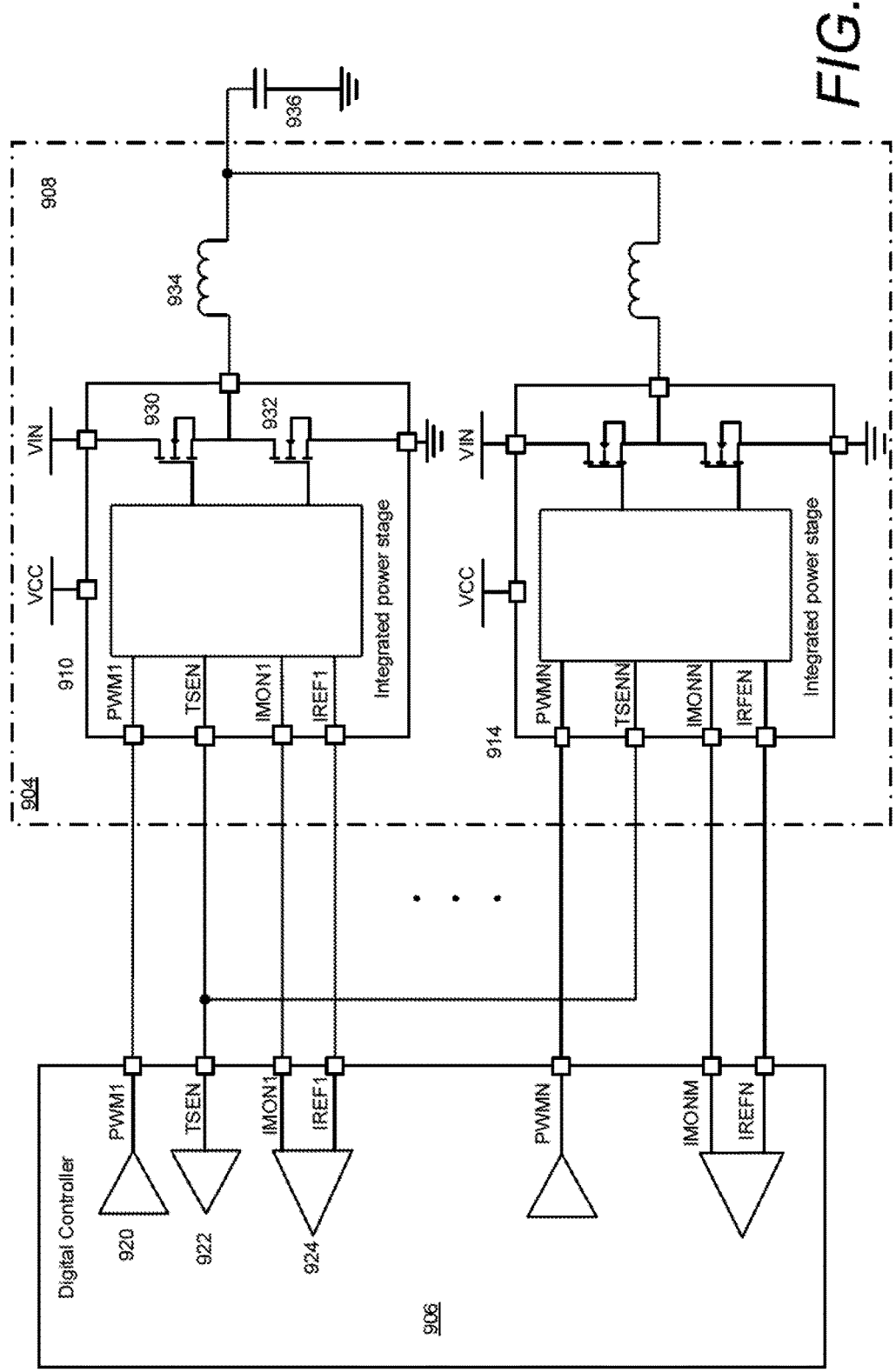
FIG. 9 depicts a block diagram illustration of a multi-phase voltage regulator module having an integrated smart power stage (SPS/Pstage) and a driver/controller integrated circuit (IC) with embedded current-sense capability, according to one or more embodiments.

FIG. 9 depicts a block diagram illustration of a multi-phase voltage regulator module having an integrated smart power stage (SPS/Pstage) and a driver/controller integrated circuit (IC) with embedded current-sense capability, according to one or more embodiments. Multi-phase VR module 904 comprises digital controller 906 and multi-phase VR 908 coupled to digital controller 906. Multi-phase VR 908 further comprises multiple integrated power stages including first integrated power stage 910 corresponding to a first operational phase of multi-phase VR 908. Also illustrated in multi-phase VR 908 is Nth integrated power stage 914 corresponding to an Nth of N operational phases of multi-phase VR 908. The N integrated power stages are coupled to an output of multi-phase VR 908. Output capacitor 936 is coupled between an output of VR 908 and ground.

As illustrated, pulse width modulation, temperature sensing and current sensing control functionalities 920, 922 and 924 associated with a first integrated power stage are integrated within digital controller 906. Furthermore, pulse width modulation, temperature sensing and current sensing control functionalities associated with other respective integrated power stages are integrated within digital controller 906. For example, pulse width modulation for phase 1 is performed using PWM1 signal. Temperature sensing for phase 1 is performed using TSEN signal. Current sensing control functionalities for phase 1 are performed using received monitored output current or current sense information IMON1 and received reference current IREF1. Multi-phase VR 908 also includes first MOSFET 930 and second MOSFET 932. In addition, multi-phase VR 908 includes inductor 934.

Digital controller 906 performs a calibration process based on the received temperature and current information by utilizing pulse width modulation (PWM) to selectively activate, deactivate, control and modify the respective operational/operating phases of multi-phase VR 908.

Digital controller 906 utilizes an "RDSON" current sense methodology of multi-phase VR 908 to measure the voltage across the "ON" state resistance of the drain to source path (RDSON) of a low side (LS) MOSFET and the voltage across the "ON" state resistance of the drain to source path (RDSON) of a high side (HS) MOSFET. Digital controller 906 utilizes the measured voltages to determine real-time phase current information. Digital controller 906 determines the real-time phase current information by using Imon and Iref signals reported to digital controller 906 from multi-phase VR 908 via the IMON and IREF output pins.

In one example implementation, the following equation applies:

$$V_{IMON}(V) - V_{IREF}(V) = 0.005 V/A * I_L(A), \text{ where, } I_L(A) \text{ is instantaneous inductor current.}$$

The signal Iref supplies the common mode voltage for a current sense signal output. In particular, the current sense signal output is provided by IMON−Iref, which is a differential output signal and a scaled representation of phase current. For example, the phase current is equal to 5 mV/A, in accordance with an industry standard. In one embodiment, digital controller 906 is able to configure a selected operating phase in one of a constant current (CC) mode and a constant voltage (CV) mode. Thus, when appropriately configured, the IMON output can be provided by either a current source or a voltage source. In one or more related implementations, digital controller 906 utilizes a power converter circuit having a translating resistor to configure a corresponding operating phase in the CC mode in which Imon is a current source.

Figure 10:
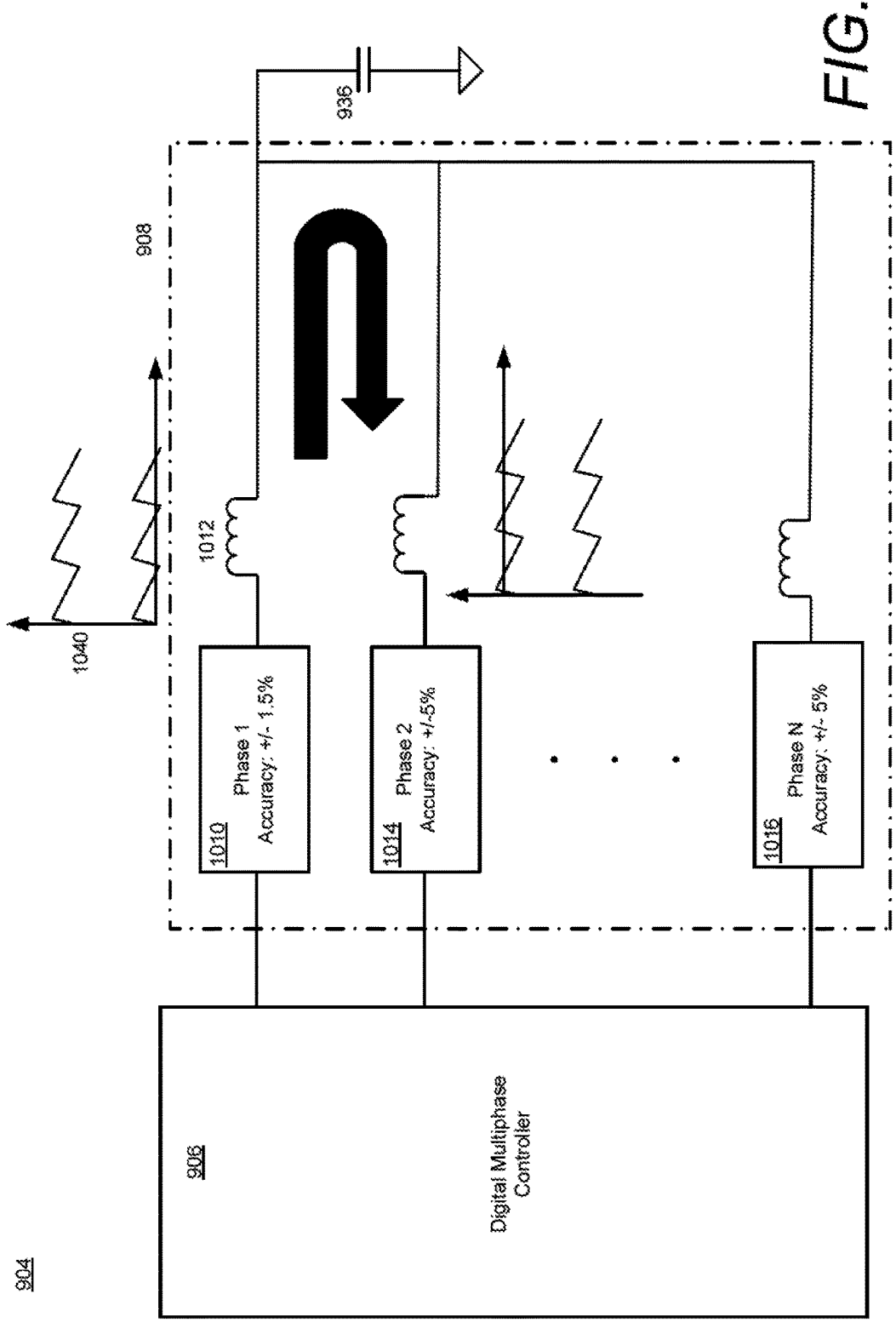
FIG. 10 depicts another block diagram illustration of a multi-phase voltage regulator module having the integrated smart power stage (SPS/Pstage) and a driver/controller integrated circuit (IC) with embedded current sense capability, according to one or more embodiments.

FIG. 10 depicts another block diagram illustration of a multi-phase voltage regulator module having the integrated smart power stage (SPS/Pstage) and a driver/controller integrated circuit (IC) with embedded current-sense capability, according to one or more embodiments. Multi-phase VR module 904 comprises digital controller 906 and multi-phase VR 908 coupled to digital controller 906. Multi-phase VR 908 comprises operational phases associated with multiple integrated power stages (not shown). In particular, multi-phase VR 908 comprises N operational phases including phase 1 1010, phase 2 1014 and phase N 1016. The N operational phases are coupled via respective inductors (e.g., inductor 1012 corresponding to phase 1 1010) to an output of multi-phase VR 908. Output capacitor 936 is coupled between an output of VR 908 and ground. Also illustrated within multi-phase VR 908 are output voltage waveforms with different offsets for respective phases such as waveform 1040 corresponding to phase 1.

Figure 11:
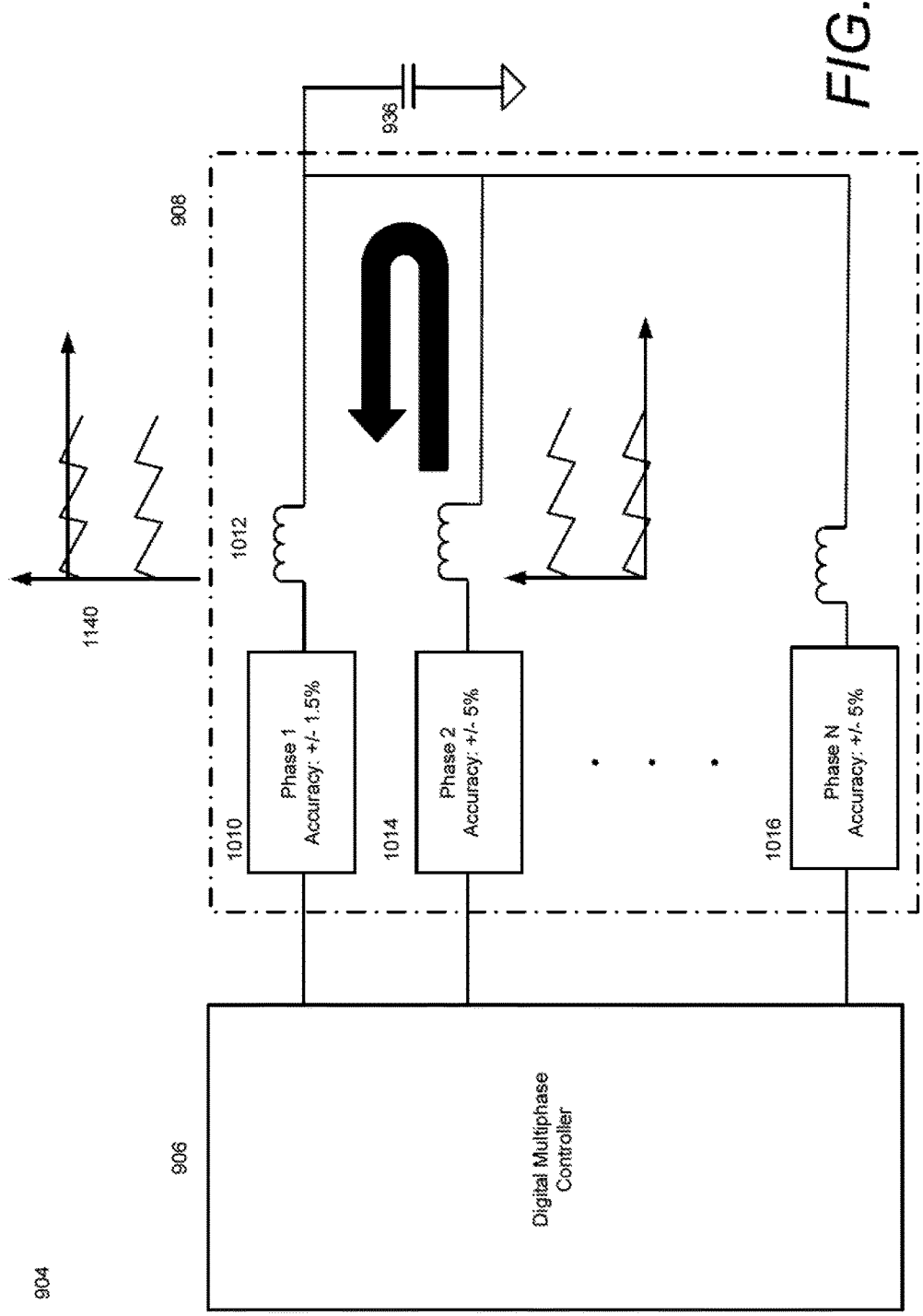
FIG. 11 provides another depiction of the block diagram illustration of the multi-phase voltage regulator module described in FIG. 10, according to one or more embodiments.

FIG. 11 provides another depiction of the block diagram illustration of the multi-phase voltage regulator module described in FIG. 10, according to one or more embodiments. FIG. 11 has an identical configuration of FIG. 10. However, current flows in a first, clockwise direction in FIG. 10 while current flows in a second, counter-clockwise direction in FIG. 11.

As illustrated within multi-phase VR 908, each phase has a specified level of accuracy associated with current sense components. For example, phase 1 has a +/−1.5% current monitoring (IMON) accuracy, phase 2 has a +/−5% IMON accuracy, and phase 3 has a +/−5% IMON accuracy. Phase 1 has a smaller accuracy range and represents a finely trimmed phase which is used as a reference phase.

In one embodiment, digital controller 906 performs calibration during an in-circuit test (ICT) or during a functional test stage. Controller 906 utilizes a single finely trimmed phase (i.e., phase 1) or "digital current meter" as a reference by which calibration is performed. Controller 906 calibrates parameters on the basis of each phase including offset, gain and other parameters, for one phase at a time. In order to maintain voltage output regulation, controller 906 configures at least a two phase operation during the calibration period since there is no load attached and only very minimal leakage current present. Controller 906 performs calibration by operating one phase in a sourcing/buck mode and another phase in a sinking/boost mode. As a result, current circulates from phase 1 to phase N and vice versa. In order to cover both negative and positive ranges of phase N Iout, controller 906 configures the buck and boost modes for respective phases to enable the current to flow in a clockwise direction, as shown in FIG. 10 to calibrate the negative side of the phase N Iout accuracy and to flow in a counter-clockwise direction, as shown in FIG. 11 to calibrate the positive side of Iout accuracy. The average current of each phase is the same during calibration so that voltage output regulation can be achieved. Output voltage waveforms with different offsets for respective phases such as waveform 1140 corresponding to phase 1 are illustrated in FIG. 11. Controller 906 saves the tuned parameters obtained during the calibration process in digital controller non-volatile memory (NVM).

Figure 12:
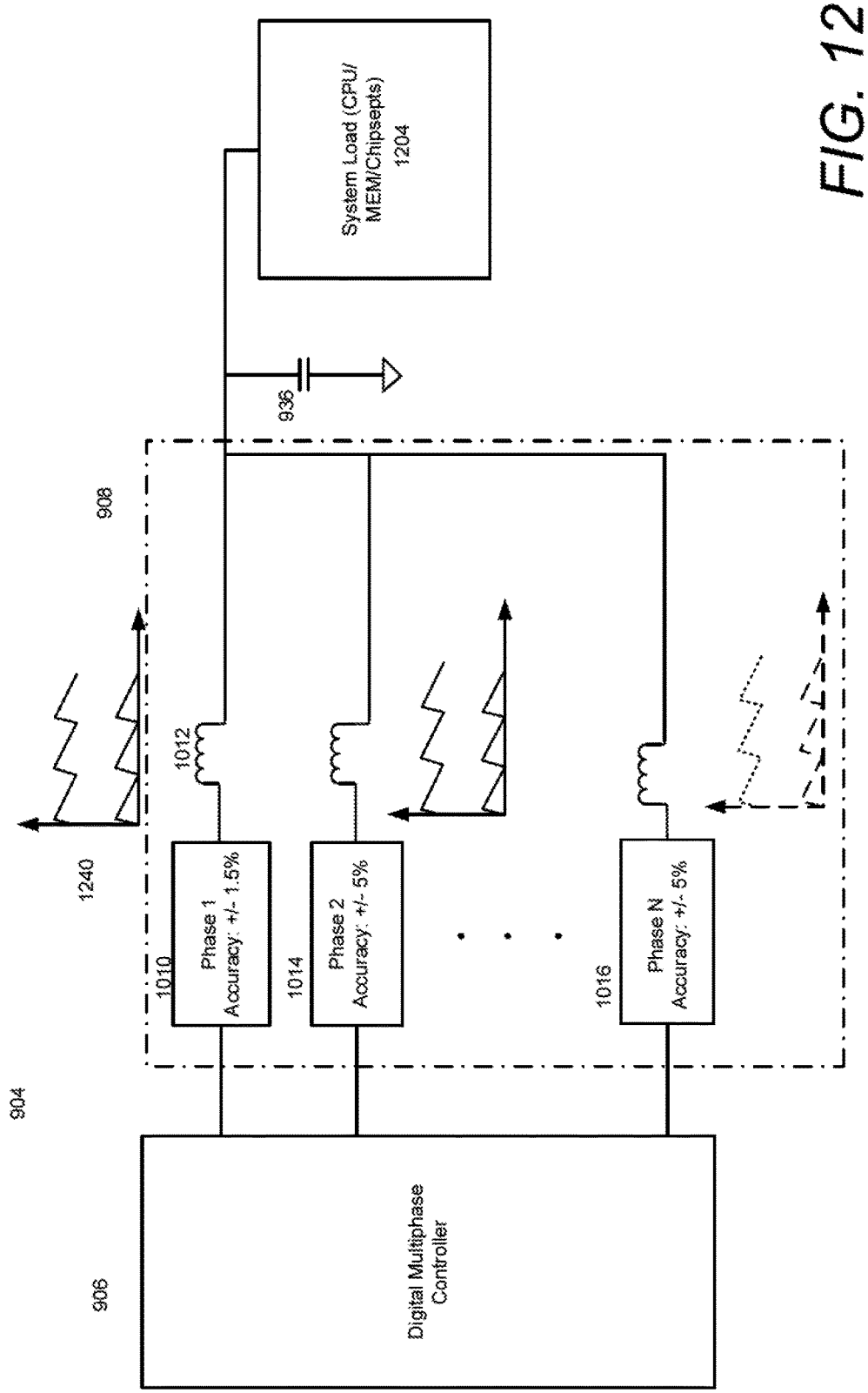
FIG. 12 depicts a block diagram illustration of a multi-phase voltage regulator module and an associated system load, according to one or more embodiments.
Figure 13:
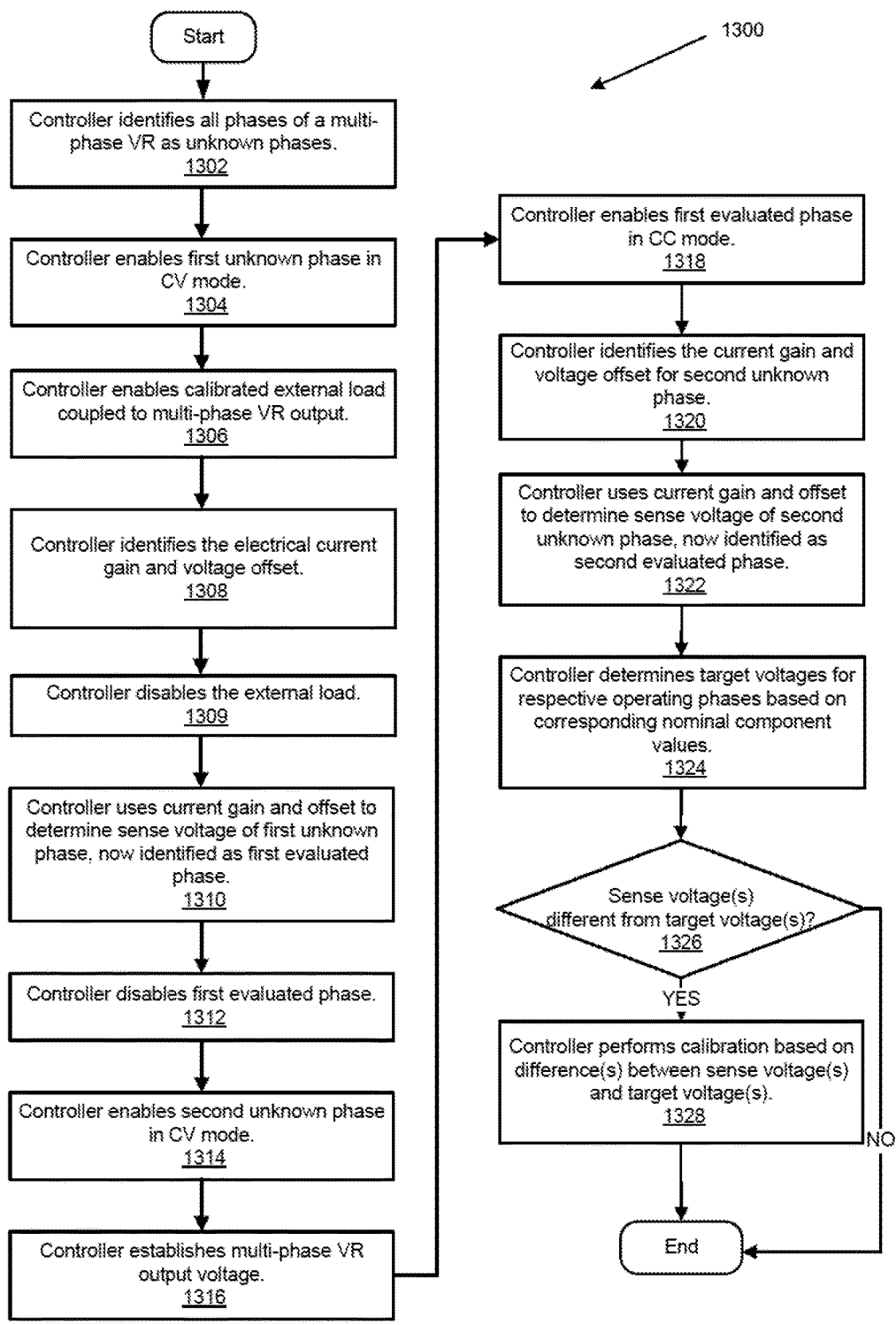
FIG. 13 is a flow chart illustrating a method for calibrating a multi-phase VR using an external load, according to one embodiment.
Figure 14:
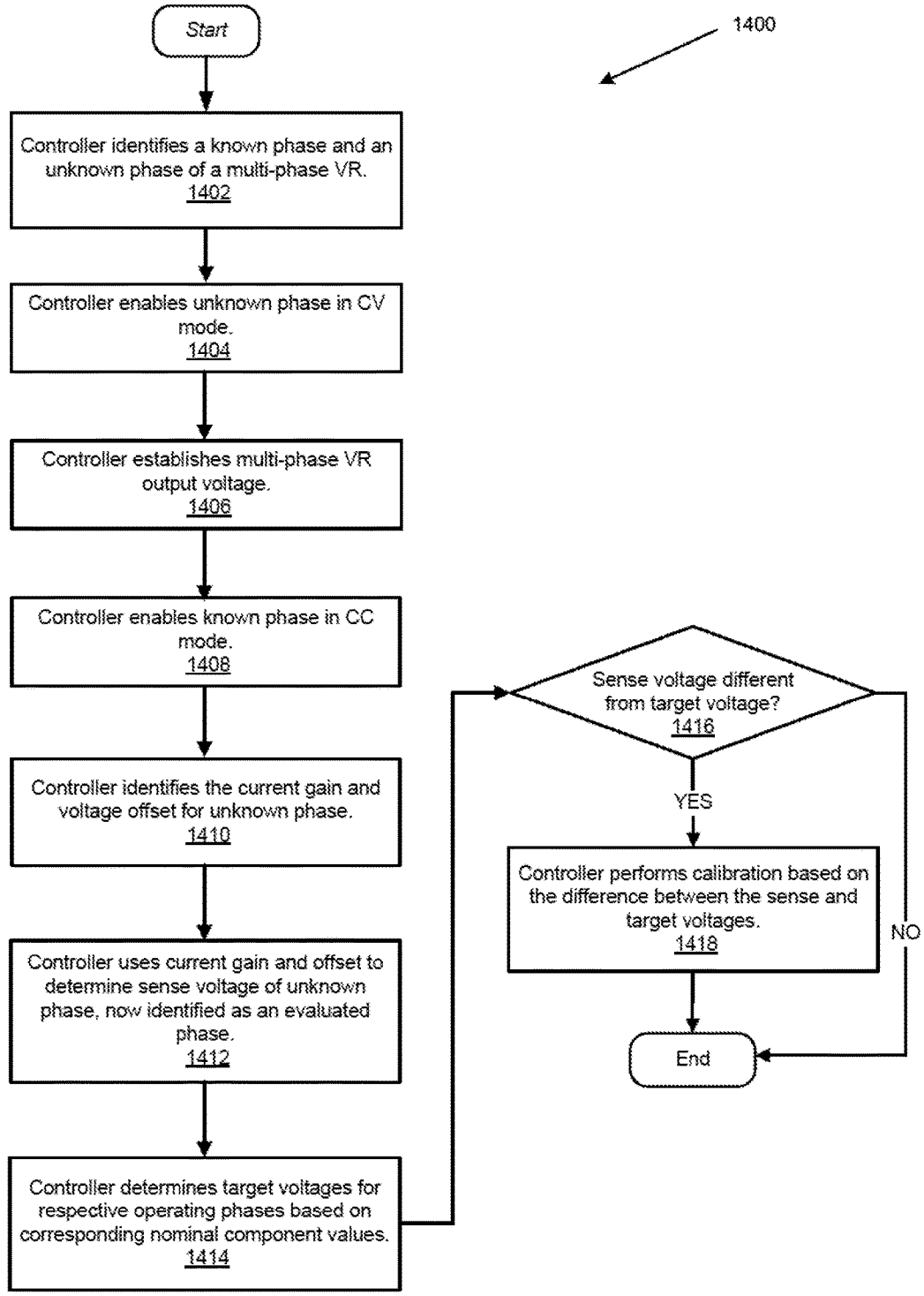
FIG. 14 is a flow chart illustrating a method for calibrating a multi-phase VR that includes a known phase, according to one embodiment.

FIG. 12 depicts a block diagram illustration of a multi-phase voltage regulator module and an associated system load, according to one or more embodiments. Multi-phase VR module 904 comprises digital controller 906 and multi-phase VR 908 coupled to digital controller 906. Multi-phase VR 908 comprises operational phases associated with multiple integrated power stages (not shown). In particular, multi-phase VR 908 comprises N operational phases including phase 1, phase 2 and phase N. The N operational phases are coupled via respective inductors (e.g., inductor 1012 corresponding to phase 1) to an output of multi-phase VR 908. Output capacitor 936 is coupled between an output of VR 908 and ground. In addition, a system load 1204 such as a central processing unit (CPU) and/or memory chipsets are coupled to an output of multi-phase VR 908. Also illustrated within multi-phase VR 908 are output voltage waveforms with different offsets for respective phases such as waveform 1240 corresponding to phase 1. In one embodiment, system load 1204 is utilized as a loading source during calibration. In one embodiment, controller 906 utilizes the configuration of FIG. 12 to provide an increased ability to sink (negative) current with high resolution.

Controller 906 performs calibration within multi-phase VR 908 which is coupled to the system load 1204 during first time power up with a CPU or other system loads present. Similar to the descriptions of FIGS. 10 and 11, phase 1 provides a finely trimmed phase "digital current meter" as reference. During the calibration process, controller 906 calibrates per phase parameters including offset, gain, and other parameters, for each phase at a time. Controller 906 performs a calibration process during which CPU power levels (e.g., P1-P10) are controlled. Controller 906 initiates several different power levels that require calibration and which can be supported by a corresponding phase. As controller 906 records the current reading from phase 1, the other phases can be turned on individually and current sense related parameters can be tuned by matching a phase 1 reading at different power levels. Controller 906 saves the tuned parameters obtained during the calibration process in digital controller NVM.

FIGS. 13-16 present flowcharts illustrating example methods by which IHS 100, and specifically, calibration controller 116 presented within the preceding figures, perform different aspects of the processes that enable one or more embodiments of the disclosure. Method 1300 represents a method for calibrating a multi-phase VR using an external load. Method 1400 represents a method for calibrating a multi-phase VR that includes a known operating phase. Method 1500 represents a method for calibrating a multi-phase VR having an integrated smart power stage (SPS/Pstage) and a driver/controller integrated circuit (IC) with embedded current-sense capability. Method 1600 represents a method for calibrating a multi-phase VR that is coupled to a system load. The description of each method is provided with general reference to the specific components illustrated within the preceding figures. It is appreciated that certain aspects of the described methods may be implemented via other processing devices and/or execution of other code/firmware. In the discussion of FIGS. 13-16, reference is also made to elements described in FIGS. 1-12.

Method 1300 begins at the start block and proceeds to block 1302 at which calibration controller 116 identifies all phases of a multi-phase voltage regulator (VR) as unknown operating phases. Calibration controller 116 enables a first unknown operating phase in a constant voltage (CV) mode (block 1304). Calibration controller 116 then enables a known, calibrated external load coupled to an output of the multi-phase VR (block 1306). Calibration controller 116 utilizes pulse width modulation (PWM) controller 212 to measure and identify a (electrical) current gain and voltage offset via sense circuit components corresponding to the first unknown operating phase (block 1308). Calibration controller 116 disables the external load (block 1309). Calibration controller 116 uses the measured/identified current gain and voltage offset to determine a sense voltage of the first unknown operating phase, now identified as a first evaluated phase (block 1310). In one embodiment, calibration controller 116 stores the current gain and voltage offset for subsequent retrieval and processing. Calibration controller 116 disables the first evaluated operating phase (block 1312). Calibration controller 116 enables the second unknown operating phase in a constant voltage (CV) mode (block 1314). Calibration controller 116 establishes an output voltage of the multi-phase VR (block 1316). In response to establishing the output voltage, calibration controller 116 enables the first evaluated phase in a constant current (CC) mode (block 1318). Calibration controller 116 measures/identifies, using the PWM controller, the current gain and voltage offset for the second unknown operating phase (block 1320). Calibration controller 116 uses the measured/identified current gain and voltage offset to determine a sense voltage of the second unknown operating phase, now identified as a second evaluated phase (block 1322). In one embodiment, calibration controller 116 stores the current gain and voltage offset for the second unknown operating phase for subsequent retrieval and processing. Calibration controller 116 determines target voltages for respective operating phases based on corresponding nominal sense component values (block 1324). Calibration controller 116 determines whether one or more sense voltages differ from the respective target voltages (decision block 1326). If one or more sense voltages differ from the respective target voltages, calibration controller 116 performs calibration based on difference(s) between sense voltage(s) and target voltage(s) (block 1328). If none of the sense voltages differs from a respective target voltage, calibration controller 116 does not perform calibration and the process concludes at the end block.

Method 1400 begins at the start block and proceeds to block 1402 at which calibration controller 116 identifies a first known operating phase and an unknown operating phase of a multi-phase voltage regulator (VR). In one implementation, the known operating phase is identifiable based on a corresponding power converter sub-circuit having and utilizing high precision sense circuit components. As a result, an asymmetric circuit design can be employed, where a known operating phase utilizes high accuracy sense components while one or more unknown phases are calibrated by the known operating phase. Calibration controller 116 enables a first unknown operating phase in a constant voltage (CV) mode (block 1404). Calibration controller 116 establishes an output voltage of the multi-phase VR (block 1406). Calibration controller 116 then enables the first known operating phase in a constant current (CC) mode (block 1408). Calibration controller 116 measures/identifies, using PWM controller 212, the electrical current gain and voltage offset for the unknown operating phase (block 1410). Calibration controller 116 uses the measured/identified current gain and voltage offset to determine a sense voltage of the unknown operating phase, now identified as an evaluated phase (block 1412). In one embodiment, calibration controller 116 stores the current gain and voltage offset for the unknown operating phase for subsequent retrieval and processing. Calibration controller 116 determines a target voltage for the unknown operating phase based on corresponding nominal sense component values (block 1414). Calibration controller 116 determines whether the sense voltage differs from the target voltage (decision block 1416). If the sense voltage differs from the target voltage, calibration controller 116 performs calibration based on difference between the sense voltage and the target voltage (block 1418). If the sense voltage does not differ from the target voltage, calibration controller 116 does not perform calibration and the process concludes at the end block.

Figure 15:
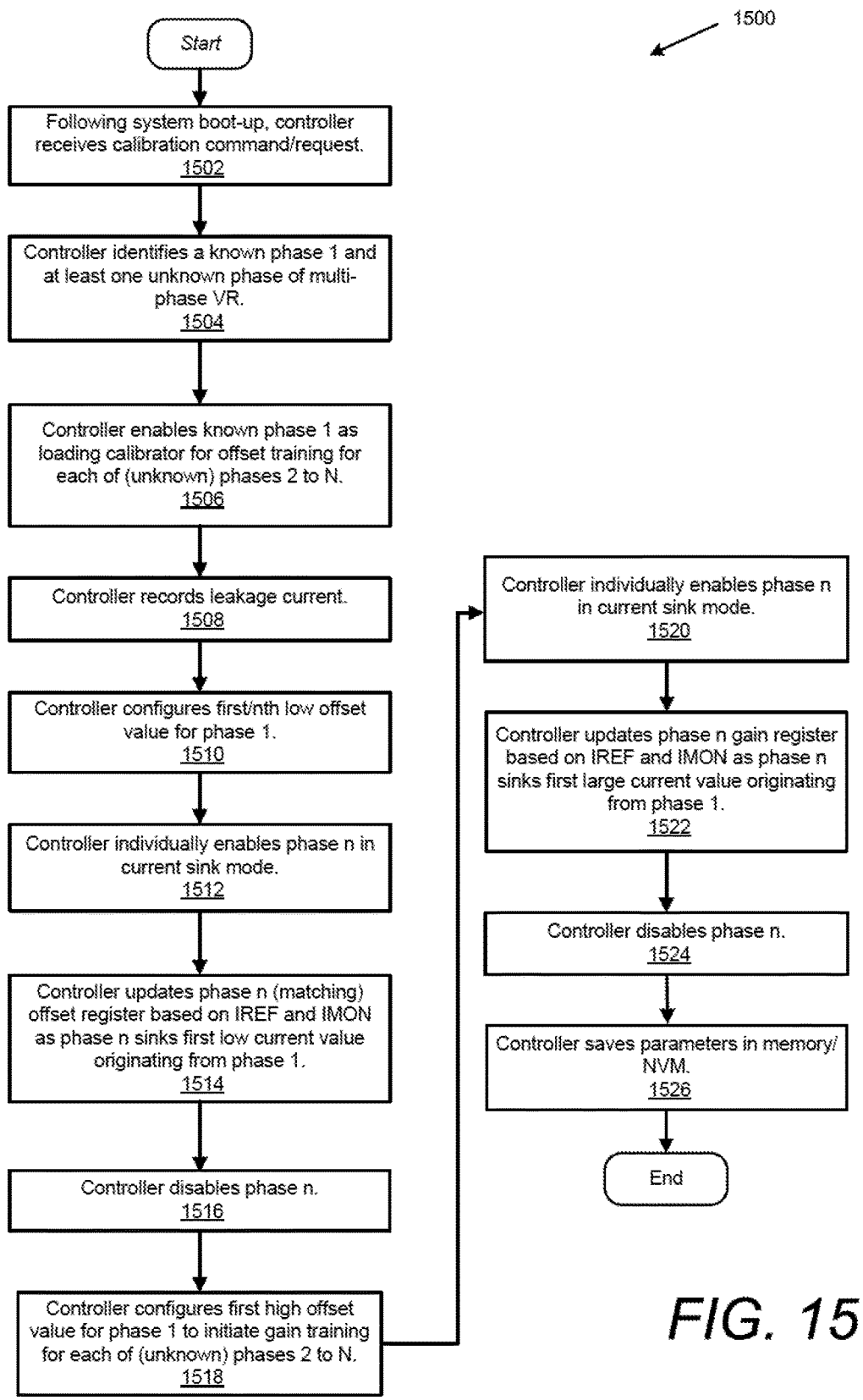
FIG. 15 is a flow chart illustrating a method for calibrating a multi-phase VR having an integrated smart power stage (SPS/Pstage) and a driver/controller integrated circuit (IC) with embedded current sense capability, according to one embodiment.

FIG. 15 is a flow chart illustrating a method for calibrating a multi-phase VR having an integrated smart power stage (SPS/Pstage) and a driver/controller integrated circuit (IC) with embedded current-sense capability, according to one embodiment. Method 1500 begins at the start block and proceeds to block 1502 at which controller 906 receives a calibration command/request following system boot-up. Controller 906 identifies a known phase 1 and at least one unknown phase of multi-phase VR 908 (block 1504). Controller 906 enables known phase 1 as loading calibrator for offset and gain training for each of (unknown) phases 2 to N (block 1506). Controller 906 records a leakage current (block 1508). Controller 906 configures first/nth low offset value for phase 1 (block 1510). Controller 906 individually enables phase n in current sink mode (block 1512). Controller 906 updates phase n (matching) offset and gain registers based on the leakage current and corresponding current sense information as phase n sinks a first low current value originating from phase 1 (block 1514). Controller 906 disables phase n (block 1516). Controller 906 configures first high offset value for phase 1 to initiate gain training for each of (unknown) phases 2 to N (block 1518). Controller 906 individually enables phase n in current sink mode (block 1520). Controller 906 updates phase n gain register based on the leakage current and corresponding current sense information as phase n sinks a first large current value originating from phase 1 (block 1522). Controller 906 disables phase n (block 1524). Controller 906 saves the parameters in memory/NVM (block 1526). The process concludes at the end block.

Figure 16:
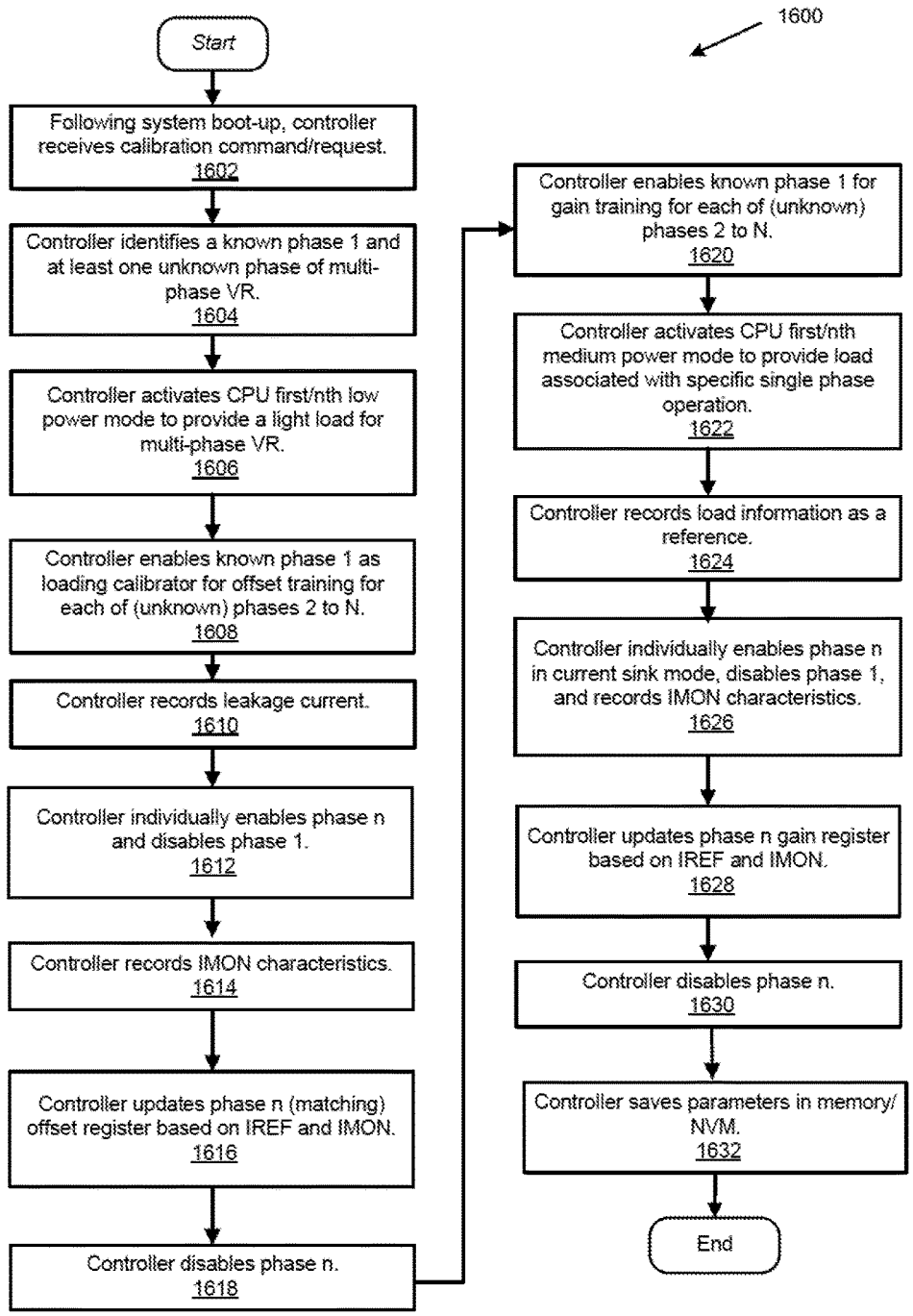
FIG. 16 is a flow chart illustrating a method for calibrating a multi-phase VR that is coupled to a system load, according to one embodiment.

FIG. 16 is a flow chart illustrating a method for calibrating a multi-phase VR that is coupled to a system load, according to one embodiment. Method 1600 begins at the start block and proceeds to block 1602 at which controller 906 receives a calibration command/request following system boot-up. Controller 906 identifies a known phase 1 and at least one unknown phase of multi-phase VR 908 (block 1604). Controller 906 activates a first/nth low power mode of the CPU to provide a light load for multi-phase VR 908 (block 1606). Controller 906 enables known phase 1 as a loading calibrator for offset training for each of (unknown) phases 2 to N (block 1608). Controller 906 records a leakage current (block 1610). For each of (unknown) phases 2 to N, controller 906 individually enables phase n, and disables phase 1 (block 1612). Controller 906 records monitored output current (IMON) characteristics (block 1614). Controller 906 updates phase n (matching) offset register based on the leakage current and the recorded IMON characteristics (block 1616). Controller 906 disables phase n (block 1618). Controller 906 enables known phase 1 to initiate gain training for each of (unknown) phases 2 to N (block 1620). Controller 906 activates a first/nth medium power mode of the CPU to provide load associated with specific single phase operation (block 1622). Controller 906 records the load information as a reference (block 1624). For each of phases 2 to N, controller 906 individually enables phase n, disables phase 1, and records IMON characteristics (block 1626). Controller 906 updates phase n gain register based on the leakage current and the recorded IMON characteristics (block 1628). Controller 906 disables phase n (block 1630).

Controller 906 saves the parameters in memory/NVM (block 1632). The process concludes at the end block.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system comprising:
  a processor;
  a power supply unit (PSU);
  a multi-phase voltage regulator (VR) module coupled to an output port of the PSU to receive input power, the VR module comprising:
    a multi-phase VR having an integrated power stage that provides pulse width modulation (PWM) functionality for controlling respective operating phases of VR current in the multi-phase VR; and
    a digital controller coupled to the multi-phase VR, wherein the controller:
    enables a known, operating phase as loading calibrator for offset training;
    determines a leakage current value which represents a reference current;
    enables a first uncalibrated operating phase;
    determines a current sense information (IMON);
    determines, for the respective enabled uncalibrated operating phase, an offset value that provides a specified target current accuracy using the current sense information and the leakage current;
    updates an offset register for the respective enabled uncalibrated operating phase with the corresponding offset value; and disables the respective enabled uncalibrated operating phase.

2. The IHS of claim 1, wherein a current initially flows in a first direction from the known operating phase to the respective enabled uncalibrated operating phase, wherein the controller:
configures a low offset value for the known phase prior to enabling the first uncalibrated operating phase;
enables a next uncalibrated operating phase in a sequence of uncalibrated operating phases;
determines for the respective enabled next uncalibrated operating phase a matching offset value that provides a specified target current accuracy;
updates an offset register for the respective enabled next unknown operating phase with a corresponding matching offset value;
disables the respective enabled next uncalibrated operating phase; and
executes said enabling, said determining, said updating and said disabling for at least one uncalibrated operational phase, when the at least one uncalibrated operational phase from the sequence has yet to be activated/calibrated.

3. The IHS of claim 2, wherein the controller:
configures an offset value for the known operating phase;
enables the first uncalibrated operating phase, wherein current flows in a first direction from the known operating phase to a respective enabled unknown operating phase;
determines for the respective enabled uncalibrated operating phase a gain value that provides a specified target current accuracy;
updates a gain register for the respective enabled uncalibrated operating phase with a corresponding gain value; and
disables the respective enabled uncalibrated operating phase.

4. The IHS of claim 3, wherein the controller:
enables a next uncalibrated operating phase in a sequence of unknown uncalibrated phases;
determines for the respective enabled next uncalibrated operating phase a gain value that provides a specified target current accuracy;
updates a gain register for the respective enabled next uncalibrated operating phase with a corresponding gain value;
disables the respective enabled next uncalibrated operating phase; and
executes said enabling, said determining, said updating and said disabling for at least one uncalibrated operational phase, when the at least one uncalibrated operational phase from the sequence has yet to be activated/calibrated during a gain tuning period.

5. The IHS of claim 4, wherein the controller:
saves the parameter values determined during offset and gain tuning periods in memory.

6. The IHS of claim 1, wherein the multi-phase VR module further comprises a system load coupled to an output of the multi-phase VR, wherein the controller:
activates the system load in a low power mode prior to enabling the known operating phase;
in response to enabling the respective uncalibrated operating phase, records monitored output current (IMON) characteristics; and
disables said known operating phase prior to disabling said respective uncalibrated operating phase.

7. The IHS of claim 6, wherein the controller:
executes a set of functions to:
enable a next uncalibrated operating phase in a sequence of uncalibrated operating phases;
disable the known operating phase;
record IMON characteristics;
determine, for the respective enabled next uncalibrated operating phase, an offset value that provides a specified target current accuracy;
update an offset register for the respective enabled next uncalibrated operating phase with the corresponding offset value;
disable the respective enabled next uncalibrated operating phase; and
executes said set of functions for at least one uncalibrated operational phase when the at least one uncalibrated operational phase from the sequence has yet to be activated/calibrated during the offset training period.

8. The IHS of claim 7, wherein the controller:
activates the system load in a medium power mode to initiate gain training;
enables the known operating phase;
records load information as a reference;
enables a first uncalibrated operating phase;
disables the known operating phase;
records IMON characteristics;
determines for the respective enabled uncalibrated operating phase a gain value that provides a specified target current accuracy;
updates a gain register for the respective enabled uncalibrated operating phase with the corresponding gain value; and
disables the respective enabled uncalibrated operating phase.

9. The IHS of claim 8, wherein the controller:
executes a set of functions to:
enables the known operating phase;
enables a next uncalibrated operating phase in a sequence of uncalibrated operating phases;
disables the known operating phase;
records IMON characteristics;
determines for the respective enabled next uncalibrated operating phase a gain value that provides a specified target current accuracy;
updates a gain register for the respective enabled next uncalibrated operating phase with the corresponding gain value;
disables the respective enabled next uncalibrated operating phase; and
executes said set of functions for at least one uncalibrated operational phase, when the at least one uncalibrated operational phase from the sequence has yet to be activated/calibrated during a gain tuning period.

10. The IHS of claim 9, wherein the controller:
saves the parameter values determined during offset and gain tuning periods in memory.

11. In an information handling system (IHS), a method comprising:
enabling a known operating phase as a loading calibrator for offset training in a multi-phase voltage regulator;
a digital controller determining a leakage current value which represents a reference current;
enabling a first uncalibrated operating phase;
determining a current sense information (IMON);
determining for the respective enabled uncalibrated operating phase an offset value that provides a specified target current accuracy using the current sense information and the leakage current;

updating an offset register for the respective enabled uncalibrated operating phase with the corresponding offset value; and the digital controller disabling the respective enabled unknown operating phase.

12. The method of claim 11, further comprising:
configuring a low offset value for the known phase prior to enabling the first uncalibrated operating phase;
enabling a next uncalibrated operating phase in a sequence of uncalibrated operating phases;
determining for the respective enabled next uncalibrated operating phase a matching offset value that provides a specified target current accuracy;
updating an offset register for the respective enabled next uncalibrated operating phase with a corresponding matching offset value;
disabling the respective enabled next uncalibrated operating phase; and
executing said enabling, said determining, said updating and said disabling for at least one uncalibrated operational phase, when the at least one uncalibrated operational phase from the sequence has yet to be activated/calibrated.

13. The method of claim 12, further comprising:
configuring an offset value for the known operating phase;
enabling a first uncalibrated operating phase, wherein current flows in a first direction from the known operating phase to the respective enabled uncalibrated operating phase;
determining for the respective enabled uncalibrated updating a gain register for the respective enabled uncalibrated operating phase with a corresponding gain value; and
disabling the respective enabled uncalibrated operating phase.

14. The method of claim 13, further comprising:
enabling a next uncalibrated operating phase in a sequence of uncalibrated operating phases;
determining for the respective enabled next uncalibrated operating phase a gain value that provides a specified target current accuracy;
updating a gain register for the respective enabled next uncalibrated operating phase with a corresponding gain value;
disabling the respective enabled next unknown operating phase; and
executing said enabling, said determining, said updating and said disabling for at least one uncalibrated operational phase, when the at least one uncalibrated operational phase from the sequence has yet to be activated/calibrated during a gain tuning period.

15. The method of claim 14, further comprising:
saving the parameter values determined during offset and gain tuning periods in memory.

16. The method of claim 11, further comprising:
activating a system load coupled to an output of the multi-phase VR in a low power mode prior to enabling the known operating phase;
in response to enabling a respective uncalibrated operating phase, recording IMON characteristics; and
disabling said known operating phase prior to disabling said respective uncalibrated operating phase.

17. The method of claim 16, further comprising:
executing a set of functions to:
enable a next uncalibrated operating phase in a sequence of uncalibrated operating phases;
disable the known operating phase;
record IMON characteristics;
determine for the respective enabled next uncalibrated operating phase an offset value that provides a specified target current accuracy;
update an offset register for the respective enabled next uncalibrated operating phase with the corresponding offset value;
disable the respective enabled next uncalibrated operating phase; and
execute said set of functions for at least one uncalibrated operational phase when the at least one uncalibrated operational phase from the sequence has yet to be activated/calibrated during the offset training period.

18. The method of claim 17, further comprising:
activating the system load in a medium power mode to initiate gain training;
enabling the known operating phase;
recording load information as a reference;
enabling the first uncalibrated operating phase;
disabling the known operating phase;
recording IMON characteristics;
determining for the respective enabled uncalibrated operating phase a gain value that provides a specified target current accuracy;
updating a gain register for the respective enabled uncalibrated operating phase with the corresponding gain value; and
disabling the respective enabled uncalibrated operating phase.

19. The method of claim 18, further comprising:
executing a set of functions to:
enable the known opera phase;
enable a next uncalibrated operating phase in a sequence of uncalibrated operating phases;
disable the known operating phase;
record IMON characteristics;
determine for the respective enabled next uncalibrated operating phase a gain value that provides a specified target current accuracy;
update a gain register for the respective enabled next uncalibrated operating phase with the corresponding gain value;
disable the respective enabled next uncalibrated operating phase; and
execute said set of functions for at least one uncalibrated operational phase, when the at least one uncalibrated operational phase from the sequence has yet to be activated/calibrated during a gain tuning period.

20. The method of claim 19, further comprising:
saving the parameter values determined during offset and gain tuning periods in memory.

* * * * *